(12) United States Patent
Manolakos et al.

(10) Patent No.: US 12,407,379 B2
(45) Date of Patent: Sep. 2, 2025

(54) OBSERVED ENVIRONMENTAL VECTOR FEEDBACK FOR WIRELESS COMMUNICATION

(71) Applicant: QUALCOMM Incorporated, San Diego, CA (US)

(72) Inventors: Alexandros Manolakos, Escondido, CA (US); June Namgoong, San Diego, CA (US); Taesang Yoo, San Diego, CA (US); Naga Bhushan, San Diego, CA (US); Jay Kumar Sundararajan, San Diego, CA (US); Pavan Kumar Vitthaladevuni, San Diego, CA (US); Krishna Kiran Mukkavilli, San Diego, CA (US); Hwan Joon Kwon, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 248 days.

(21) Appl. No.: 18/041,038

(22) PCT Filed: Jul. 1, 2021

(86) PCT No.: PCT/US2021/070810
§ 371 (c)(1),
(2) Date: Feb. 8, 2023

(87) PCT Pub. No.: WO2022/056503
PCT Pub. Date: Mar. 17, 2022

(65) Prior Publication Data
US 2024/0022288 A1    Jan. 18, 2024

(30) Foreign Application Priority Data

Sep. 11, 2020   (GR) ............................... 20200100554

(51) Int. Cl.
*H04B 7/04*     (2017.01)
*H04B 7/0417*   (2017.01)

(52) U.S. Cl.
CPC .................................. *H04B 7/0417* (2013.01)

(58) Field of Classification Search
CPC ..................................................... H04B 7/0417
See application file for complete search history.

(56) References Cited

U.S. PATENT DOCUMENTS 9,838,104 B1 *   12/2017   Zhang ..................... H03M 7/30
2018/0367192 A1  12/2018   O'Shea et al.
(Continued)

FOREIGN PATENT DOCUMENTS

| EP | 3576312 A1 | 12/2019 | |
| WO | 2019229152 A1 | 12/2019 | |
| WO | WO-2020180221 A1 * | 9/2020 | .......... H03M 7/3059 |

OTHER PUBLICATIONS

Li et al. (A Novel CSI Feedback Approach for Massive MIMO Using LSTM-Attention CNN, IEEE Access, vol. 8, Jan. 3, 2020, pp. 7295-7301 (Year: 2020).*

(Continued)

*Primary Examiner* — Freshteh N Aghdam
(74) *Attorney, Agent, or Firm* — Harrity & Harrity, LLP

(57) ABSTRACT

Various aspects of the present disclosure relate to wireless communication. In some aspects, a client may receive an observed environmental vector feedback configuration associated with a reporting procedure for reporting updates corresponding to at least one observed environmental vector that is based at least in part on one or more features associated with an environment of the client, wherein the observed environmental vector comprises input for a first machine learning component that determines client specific parameters for use by a second machine learning component. The client may transmit an update corresponding to the (Continued)

at least one observed environmental vector based at least in part on the observed environmental vector feedback configuration. Numerous other aspects are provided.

30 Claims, 13 Drawing Sheets

(56) References Cited

U.S. PATENT DOCUMENTS

2020/0052760 A1    2/2020  Nammi et al.
2020/0092067 A1*   3/2020  Nguyen ............... H04L 1/0693

OTHER PUBLICATIONS

International Search Report and Written Opinion—PCT/US2021/070810—ISA/EPO—Oct. 14, 2021.
Qi L., et al., "A Novel CSI Feedback Approach for Massive MIMO Using LSTM-Attention CNN", IEEE Access, IEEE, USA, vol. 8, Jan. 3, 2020 (Jan. 3, 2020), pp. 7295-7302, XP011765536, 8 Pages, DOI: 10.1109/ACCESS.2020.2963896 [Retrieved on Jan. 13, 2020] p. 7295—p. 7301 figures 1-4 tables 1.2 section I-section III.
Qi L., et al., "A Novel CSI Feedback Approach for Massive MIMO Using LSTM-Attention CNN", IEEE Access, IEEE, USA, vol. 8, Jan. 3, 2020 (Jan. 3, 2020), pp. 7295-7302.

* cited by examiner

OBSERVED ENVIRONMENTAL VECTOR FEEDBACK FOR WIRELESS COMMUNICATION

CROSS-REFERENCE TO RELATED APPLICATIONS

This Patent Application is a 371 national stage of PCT Application No. PCT/US2021/070810 filed on Jul. 1, 2021, entitled "OBSERVED ENVIRONMENTAL VECTOR FEEDBACK FOR WIRELESS COMMUNICATION," which claims priority to Greece Patent Application No. 20200100554, filed on Sep. 11, 2020, entitled "OBSERVED ENVIRONMENTAL VECTOR FEEDBACK FOR WIRELESS COMMUNICATION," and assigned to the assignee hereof. The disclosure of the prior Applications are considered part of and are incorporated by reference into this Patent Application.

INTRODUCTION

Aspects of the present disclosure generally relate to wireless communication and to techniques and apparatuses for supporting machine learning components.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. "Downlink" (or forward link) refers to the communication link from the BS to the UE, and "uplink" (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LIE and NR technologies. Preferably, these improvements should be applicable to other multiple access technologies and the telecommunication standards that employ these technologies.

SUMMARY

In some aspects, a method of wireless communication performed by a client includes receiving an observed environmental vector feedback configuration associated with a reporting procedure for reporting updates corresponding to at least one observed environmental vector that is based at least in part on one or more features associated with an environment of the client. The observed environmental vector comprises input for a first machine learning component that determines client specific parameters for use by a second machine learning component. The method includes transmitting an update corresponding to the at least one observed environmental vector based at least in part on the observed environmental vector feedback configuration.

In some aspects, a method of wireless communication performed by a server includes transmitting an observed environmental vector feedback configuration associated with a reporting procedure for reporting updates corresponding to at least one observed environmental vector that is based at least in part on one or more features associated with an environment of a client. The observed environmental vector comprises input for a first machine learning component that determines client specific parameters for use by a second machine learning component. The method includes receiving an update corresponding to the at least one observed environmental vector based at least in part on the observed environmental vector feedback configuration.

In some aspects, a client for wireless communication includes a memory and one or more processors coupled to the memory. The memory and the one or more processors are configured to receive an observed environmental vector feedback configuration associated with a reporting procedure for reporting updates corresponding to at least one observed environmental vector that is based at least in part on one or more features associated with an environment of the client. The observed environmental vector comprises input for a first machine learning component that determines client specific parameters for use by a second machine learning component. The memory and the one or more processors are configured to transmit an update corresponding to the at least one observed environmental vector based at least in part on the observed environmental vector feedback configuration.

In some aspects, a server for wireless communication includes a memory and one or more processors coupled to the memory. The memory and the one or more processors are configured to transmit an observed environmental vector feedback configuration associated with a reporting procedure for reporting updates corresponding to at least one observed environmental vector that is based at least in part on one or more features associated with an environment of a client. The observed environmental vector comprises input for a first machine learning component that determines client specific parameters for use by a second machine learning component. The memory and the one or more processors are configured to receive an update corresponding to the at least one observed environmental vector based at least in part on the observed environmental vector feedback configuration.

In some aspects, a non-transitory computer-readable medium storing a set of instructions for wireless communication includes one or more instructions that, when executed by one or more processors of a client, cause the client to receive an observed environmental vector feedback configuration associated with a reporting procedure for reporting updates corresponding to at least one observed environmental vector that is based at least in part on one or more features associated with an environment of the client. The observed environmental vector comprises input for a first machine learning component that determines client specific parameters for use by a second machine learning component. The one or more instructions cause the client to transmit an update corresponding to the at least one observed environmental vector based at least in part on the observed environmental vector feedback configuration.

In some aspects, a non-transitory computer-readable medium storing a set of instructions for wireless communication includes one or more instructions that, when executed by one or more processors of a server, cause the server to transmit an observed environmental vector feedback configuration associated with a reporting procedure for reporting updates corresponding to at least one observed environmental vector that is based at least in part on one or more features associated with an environment of a client. The observed environmental vector comprises input for a first machine learning component that determines client specific parameters for use by a second machine learning component. The one or more instructions cause the server to receive an update corresponding to the at least one observed environmental vector based at least in part on the observed environmental vector feedback configuration.

In some aspects, an apparatus for wireless communication includes means for receiving an observed environmental vector feedback configuration associated with a reporting procedure for reporting updates corresponding to at least one observed environmental vector that is based at least in part on one or more features associated with an environment of the apparatus. The observed environmental vector comprises input for a first machine learning component that determines client specific parameters for use by a second machine learning component. The apparatus includes means for transmitting an update corresponding to the at least one observed environmental vector based at least in part on the observed environmental vector feedback configuration.

In some aspects, an apparatus for wireless communication includes means for transmitting an observed environmental vector feedback configuration associated with a reporting procedure for reporting updates corresponding to at least one observed environmental vector that is based at least in part on one or more features associated with an environment of a client. The observed environmental vector comprises input for a first machine learning component that determines client specific parameters for use by a second machine learning component. The apparatus includes means for receiving an update corresponding to the at least one observed environmental vector based at least in part on the observed environmental vector feedback configuration.

Aspects generally include a method, apparatus, system, computer program product, non-transitory computer-readable medium, user equipment, base station, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
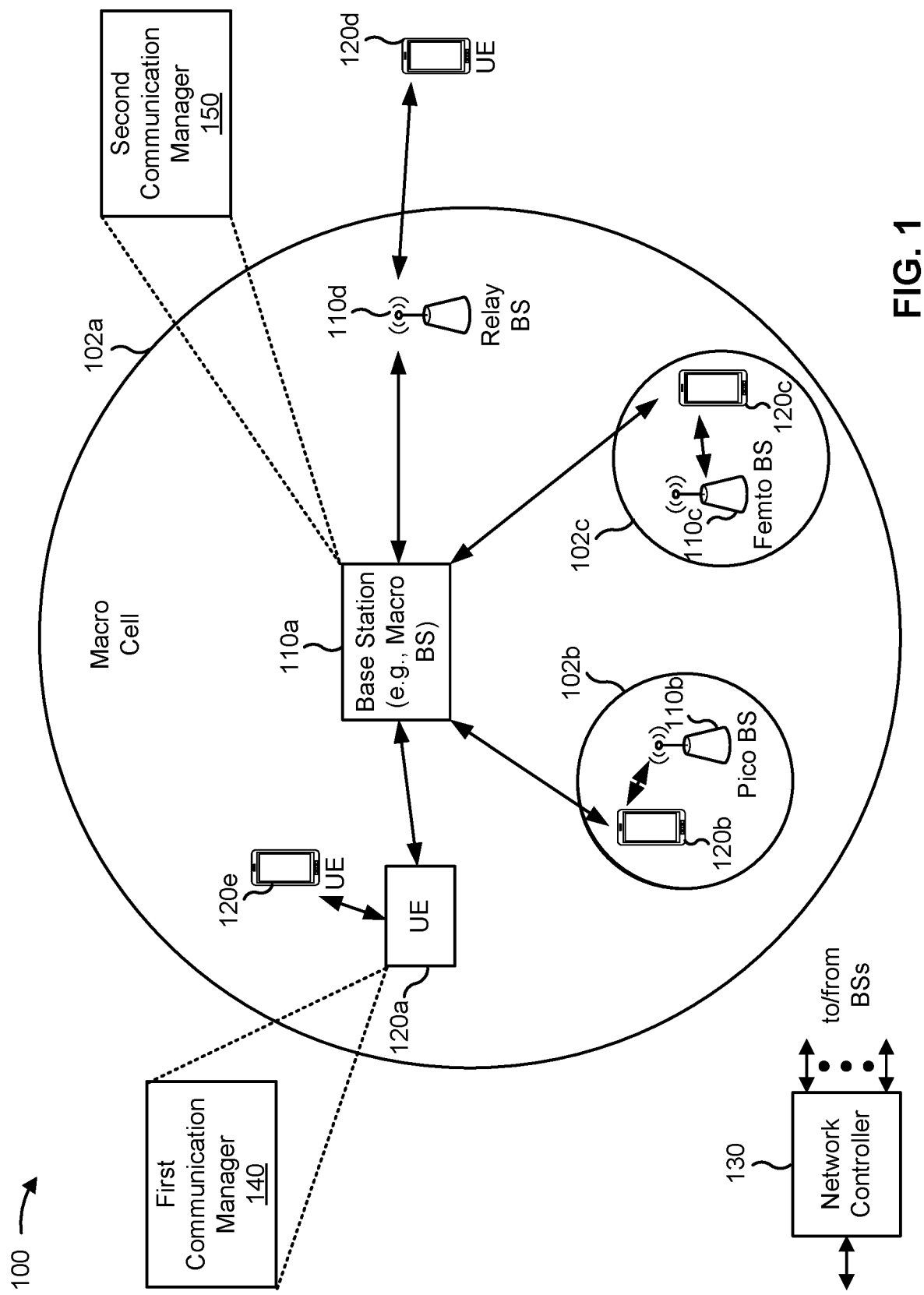
FIG. 1 is a diagram illustrating an example of a wireless network, in accordance with the present disclosure.

A client operating in a network may report information to a server. The information may include information associated with received signals and/or positioning information, among other examples. For example, a client may perform measurements associated with reference signals and report the measurements to a server. In some examples, the client may measure reference signals during a beam management process for channel state feedback (CSF), may measure received power of reference signals from a serving cell and/or neighbor cells, may measure signal strength of inter-radio access technology (e.g., WiFi) networks, and/or may measure sensor signals for detecting locations of one or more objects within an environment. However, reporting information to the server may consume communication and/or network resources.

To mitigate consumption of resources, a client (e.g., a UE, a base station, a transmit receive point (TRP), a network device, a low-earth orbit (LEO) satellite, a medium-earth orbit (MEO) satellite, a geostationary earth orbit (GEO) satellite, and/or a high elliptical orbit (HEO) satellite) may use one or more machine learning components (e.g., neural networks) that may be trained to learn dependence of measured qualities on individual parameters, isolate the measured qualities through various layers of the one or more machine learning components (also referred to as "operations"), and compress measurements in a way that limits compression loss. The client may transmit the compressed measurements to the server (e.g., a TRP, another UE, and/or a base station).

The server may decode the compressed measurements using one or more decompression operations and reconstruction operations associated with one or more machine learning components. The one or more decompression and reconstruction operations may be based at least in part on a set of features of the compressed data set to produce reconstructed measurements. The server may perform a wireless communication action based at least in part on the reconstructed measurements.

In some cases, a client and a server may be configured with a machine learning component for compressing and reconstructing information. In some cases, the machine learning component may be trained using federated learning. Federated learning is a machine learning technique that enables multiple clients to collaboratively learn neural network models, while the server does not collect the data from the clients. Federated learning techniques may involve one or more global neural network models trained from data stored on multiple clients. For example, in a Federated Averaging algorithm, the server sends the neural network model to the clients. Each client trains the received neural network model using its own data and sends back an updated neural network model to the server. The server averages the updated neural network models from the clients to obtain a new neural network model.

However, in some cases, some clients may be operating in different scenarios than other clients (e.g. indoor/outdoor, stationary in a coffee shop/mobile on a highway, and/or the like). In some cases, different clients may be subject to different implementation aspects (e.g. different form factors, different RF impairments, and/or the like). As a result, in some examples, finding a neural network model that works well on all the devices in a federated learning network in terms of physical layer link performance may be difficult.

To provide and train personalized machine learning components adapted for respective clients, a client may be configured with one or more conditioning networks and one or more autoencoders for compressing and reconstructing information. An autoencoder may include one or more neural networks that may be used to perform a wireless communication task (e.g., CSF computation, positioning, and/or channel demodulation). A conditioning network may include one or more machine learning components that may be configured to determine a set of client-specific parameters for one or more autoencoders.

A conditioning network may determine a conditioning vector based at least in part on an observed environmental vector associated with the environment of the client. A conditioning vector may include a set of client-specific parameters for one or more autoencoders. An observed environmental vector may include an array of observed values associated with one or more features of an environment of a client. An environment of a client may include any characteristic associated with the client that may affect an operation of the client, a signal received by the client, and/or a signal transmitted by the client. An operation of the client may include any operation that may be performed on, or in connection with, any type of information. An operation of the client may include, for example, receiving a signal, decoding a signal, demodulating a signal, processing a signal, encoding a signal, modulating a signal, and/or transmitting a signal. In some aspects, the one or more features of the environment of the client may include characteristics of the client, large scale channel characteristics, channel information, signal information, and/or image data, among other examples. The client may determine a latent vector using a client autoencoder and based at least in part on the set of client-specific parameters and a set of shared parameters. The set of shared parameters may include autoencoder parameters that are shared among multiple autoencoders deployed at multiple clients and one or more autoencoders deployed at the server.

The client may transmit the observed environmental vector and the latent vector to a server. The server may use a conditioning network to determine client-specific parameters based at least in part on the observed environmental vector, and use a decoder corresponding to the autoencoder to recover the observed wireless communication vector based at least in part on the client-specific parameters, the shared parameters, and the latent vector. Aspects of the techniques described herein may be used for any number of cross-node machine learning challenges including, for example, facilitating channel state feedback, facilitating positioning of a client, learning of modulation and/or waveforms for wireless communication, and/or the like.

In some aspects, one or more conditioning networks and one or more autoencoders may be employed at the client. A client may be a software and/or hardware entity configured to interact with a server in a client-server relationship. In some aspects, for example, a client may include a UE, a base station, a transmit receive point (TRP), a network device, an integrated access and backhaul (IAB) network node, a low-earth orbit (LEO) satellite, a medium-earth orbit (MEO) satellite, a geostationary earth orbit (GEO) satellite, and/or a high elliptical orbit (HEO) satellite. A conditioning network employed at a client may be referred to herein as a "conditioning network" (when it is clear from context that the conditioning network is employed at a client as opposed to a server) or a "client conditioning network." Similarly, an autoencoder employed at a client may be referred to herein as an "autoencoder" (when it is clear from context that the autoencoder is employed at a client as opposed to a server) or a "client autoencoder."

In some aspects, one or more conditioning networks and one or more autoencoders may be employed at a server. A server may be a software and/or hardware entity configured to interact with a client in a client-server relationship. In some aspects, for example, a client may include a UE, a base station, a TRP, a network device, an IAB)\ network node, an LEO satellite, an MEO satellite, a GEO satellite, and/or an HEO satellite. A conditioning network employed at a server may be referred to herein as a "conditioning network" (when it is clear from context that the conditioning network is employed at a server as opposed to a client) or a "server conditioning network." An autoencoder employed at a server may be referred to as an "autoencoder" (when it is clear from context that the autoencoder is employed at a server as opposed to a client) or a "server autoencoder."

As indicated above, during the training, autoencoders and conditioning networks may be collaboratively learned using the federated learning techniques. In some cases, a conditioning network may be learned and/or updated less frequently than a set of autoencoders. The conditioning network determines a conditioning vector based at least in part on an observed environmental vector. The observed environmental vector may include elements that do not change or that change infrequently (e.g., client identifiers, positioning information associated with an unmoving client, antenna identifiers, and other infrequency changing environmental information). As a result, a conditioning network may change infrequently and feeding back updates to the observed environmental vector to the server each time a latent vector is provided to the server may result in unnecessary consumption of communication resources.

Aspects of the techniques and apparatuses described herein may facilitate observed environmental vector feedback for autoencoders in wireless communication. In some aspects, a client may receive an observed environmental vector feedback configuration associated with a reporting procedure for reporting updates corresponding to at least one observed environmental vector that is based at least in part on one or more features associated with an environment of the client device. The client may determine an update corresponding to the at least one observed environmental vector and may transmit the update to a server based at least in part on the observed environmental vector feedback configuration. The observed environmental vector feedback configuration may configure the client to provide updates in a manner that reduces consumption of communication resources. In this way, aspects described herein may facilitate use of machine learning components without increasing resource consumption unnecessarily. Aspects of the techniques described herein may be used for any number of cross-node machine learning challenges including, for example, facilitating channel state feedback, facilitating positioning of a client, and/or learning of modulation and/or waveforms for wireless communication.

A conditioning network and an autoencoder are examples of machine learning components. A machine learning component is a component (e.g., hardware, software, or a combination thereof) of a client that performs one or more machine learning procedures. A machine learning component may include, for example, hardware and/or software that may learn to perform a procedure without being explicitly trained to perform the procedure. A machine learning component may include, for example, a feature learning processing block and/or a representation learning processing block. A machine learning component may include one or more neural networks. A neural network may include, for example, an autoencoder.

In some aspects, an autoencoder may be configured to determine a latent vector based at least in part on an observed wireless communication vector. In some aspects, the observed wireless communication vector and the latent vector may be associated with a wireless communication task. The observed wireless communication vector may include an array of observed values associated with one or more measurements obtained in connection with a wireless communication. In some aspects, for example, the wireless communication task may include determining channel state feedback (CSF), determining positioning information associated with the client, determining a modulation associated with a wireless communication, and/or determining a waveform associated with a wireless communication. The latent vector is the output of a machine learning component that takes the observed wireless communication vector as input. The latent vector may include an array of hidden values associated with one or more aspects of the observed communication vector.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

Various aspects may include one or more clients that may communicate with one or more servers. Clients may include software and/or hardware configured to perform one or more operations and to communicate with one or more servers. Servers may include software and/or hardware configured to perform one or more operations and to communicate with one or more clients. Clients and/or servers may be, include, be included in, and/or be implemented on any number of different types of computing devices such as, for example, network devices (e.g., wireless network devices and/or wired network devices), portable computers, laptops, tablets, workstations, personal computers, controllers, in-vehicle control networks, Internet-of-Things (IoT) devices, traffic control devices, integrated access and backhaul (IAB) nodes, user equipment (UEs), base stations, relay stations, switches, routers, customer premises equipment (CPEs), and/or vehicles (e.g., land-based vehicles, aerial vehicles, non-terrestrial vehicles, and/or water-based vehicles).

As indicated above, in some aspects, clients and/or servers may be, include, be included within, and/or be implemented on one or more wireless network devices. For example, in some aspects, a client may be, include, be included in, and/or be implemented on a UE and a server may be, include, be included in, and/or be implemented on a base station. In some aspects, a client may include a server that is configured to operate as a client. In some aspects, a server may include a client configured to operate as a server.

In some aspects, one or more servers and/or one or more clients may communicate using any number of types of communication connections such as, for example, wired networks, wireless networks, multi-hop networks, and/or combinations of wired networks, wireless networks, and/or multi-hop networks.

Figure 2:
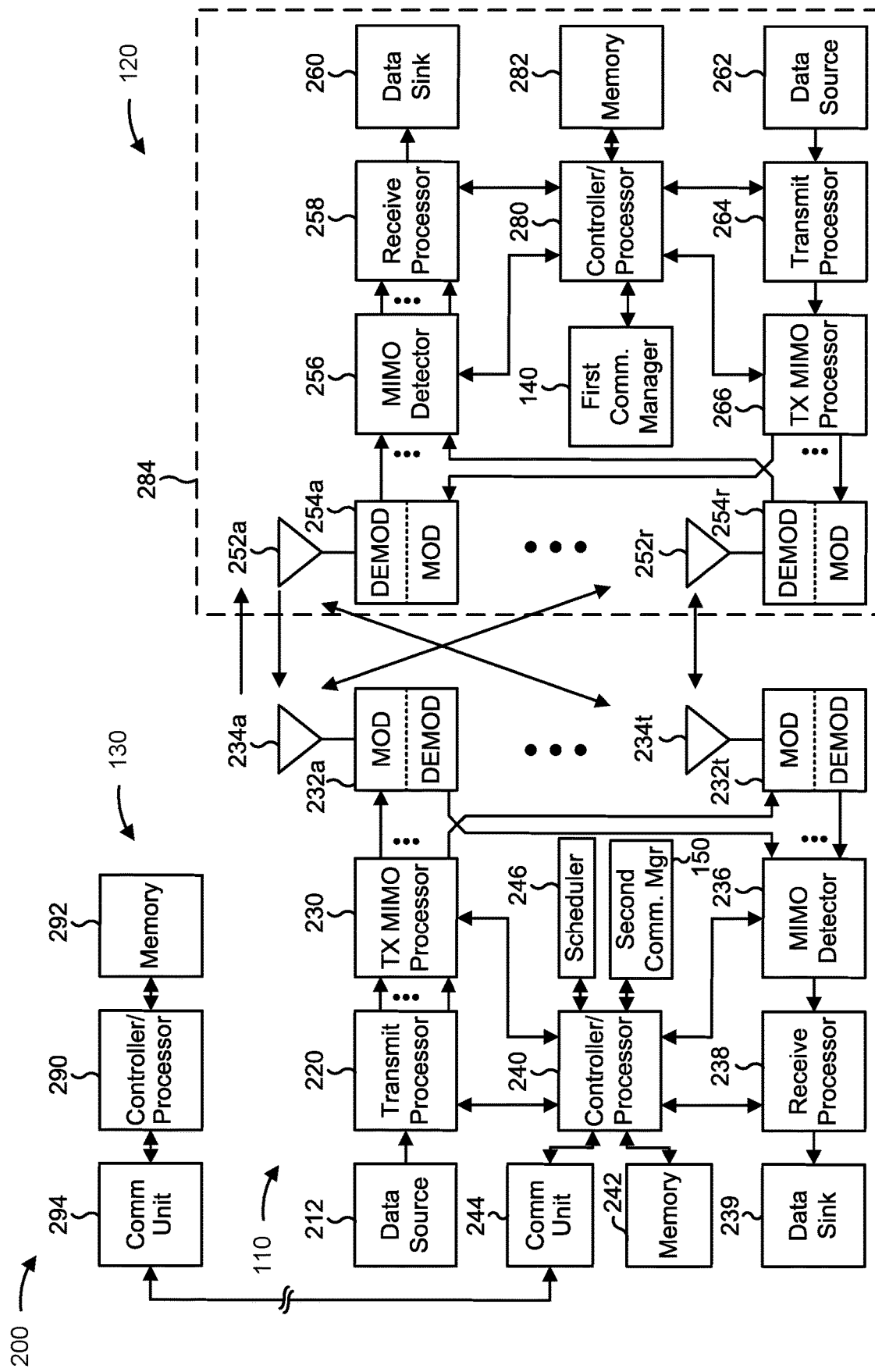
FIG. 2 is a diagram illustrating an example of a base station in communication with a UE in a wireless network, in accordance with the present disclosure.

FIGS. 1 and 2, and the accompanying text below, provide examples of aspects of wireless networks and wireless network devices that may be used to implement one or more aspects of subject matter disclosed herein. FIGS. 3-7, and the accompanying text, describe aspects of operations that may be performed by clients and/or servers, which may include, for example, UEs and base stations as shown in, and described in connection with, FIGS. 1 and 2, and/or other implementations of clients and/or servers such as, for example, those described above. FIGS. 8-13, and the accompanying text, describe examples of apparatuses for implementing clients and/or servers, in accordance with the present disclosure. The apparatuses may include wireless network devices and/or any number of other computing devices, as indicated above in connection with clients and/or servers.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 4:
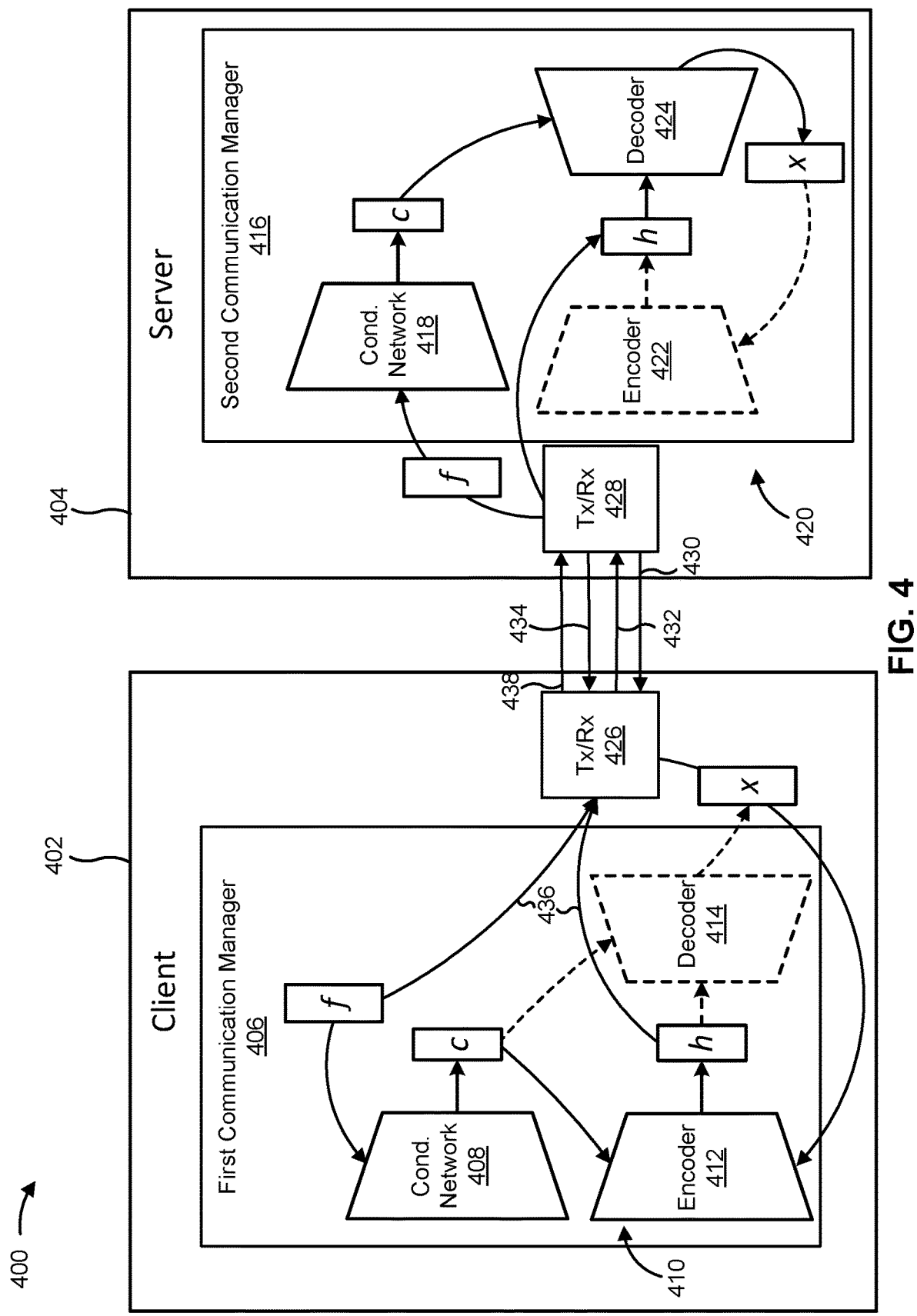
FIG. 4 is a diagram illustrating an example of observed environmental vector feedback in wireless communication, in accordance with the present disclosure.

FIG. 1 is a diagram illustrating an example of a wireless network 100, in accordance with the present disclosure. As indicated above, one or more aspects of the wireless network 100 may be used to implement aspects of one or more clients and servers as shown in FIG. 4, and described below in connection therewith. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used. In some aspects, a base station 110 may be, include, be included in, and/or be used to implement a server such as the server 404 shown in FIG. 4 and described below. A UE may be, include, be included in, and/or be used to implement a client such as the client 402 shown in FIG. 4 and described below. In some aspects, a base station 110 may be may be, include, be included in, and/or be used to implement a client. In some aspects, a UE 120 may be, include, be included in, and/or be used to implement a server.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. ABS for a pico cell may be referred to as a pico BS. ABS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. ABS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

In some aspects, the wireless network 100 may include one or more non-terrestrial network (NTN) deployments in which a non-terrestrial wireless communication device may include a UE (referred to herein, interchangeably, as a "non-terrestrial UE"), a BS (referred to herein, interchangeably, as a "non-terrestrial BS" and "non-terrestrial base station"), a relay station (referred to herein, interchangeably, as a "non-terrestrial relay station"), and/or the like. As used herein, "NTN" may refer to a network for which access is facilitated by a non-terrestrial UE, non-terrestrial BS, a non-terrestrial relay station, and/or the like.

The wireless network 100 may include any number of non-terrestrial wireless communication devices. A non-terrestrial wireless communication device may include a satellite, a manned aircraft system, an unmanned aircraft system (UAS) platform, and/or the like. A maimed aircraft system may include an airplane, helicopter, a dirigible, and/or the like. A satellite may include a low-earth orbit (LEO) satellite, a medium-earth orbit (MEO) satellite, a geostationary earth orbit (GEO) satellite, a high elliptical orbit (HEO) satellite, and/or the like. A UAS platform may include a high-altitude platform station (HAPS), and may include a balloon, a dirigible, an airplane, and/or the like. A non-terrestrial wireless communication device may be part of an NTN that is separate from the wireless network 100. Alternatively, an NTN may be part of the wireless network 100. Satellites may communicate directly and/or indirectly with other entities in wireless network 100 using satellite communication. The other entities may include UEs (e.g., terrestrial UEs and/or non-terrestrial UEs), other satellites in the one or more NTN deployments, other types of BSs (e.g., stationary and/or ground-based BSs), relay stations, one or more components and/or devices included in a core network of wireless network 100, and/or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul. For example, in some aspects, the wireless network 100 may be, include, or be included in a wireless backhaul network, sometimes referred to as an integrated access and backhaul (IAB) network. In an IAB network, at least one base station (e.g., base station 110) may be an anchor base station that communicates with a core network via a wired backhaul link, such as a fiber connection. An anchor base station may also be referred to as an IAB donor (or IAB-donor), a central entity, a central unit, and/or the like. An IAB network may include one or more non-anchor base stations, sometimes referred to as relay base stations, IAB nodes (or IAB-nodes). The non-anchor base station may communicate directly with or indirectly with (e.g., via one or more non-anchor base stations) the anchor base station via one or more backhaul links to form a backhaul path to the core network for carrying backhaul traffic. Backhaul links may be wireless links Anchor base station(s) and/or non-anchor base station(s) may communicate with one or more UEs (e.g., UE 120) via access links, which may be wireless links for carrying access traffic.

In some aspects, a radio access network that includes an IAB network may utilize millimeter wave technology and/or directional communications (e.g., beamforming, precoding and/or the like) for communications between base stations and/or UEs (e.g., between two base stations, between two UEs, and/or between a base station and a UE). For example, wireless backhaul links between base stations may use millimeter waves to carry information and/or may be directed toward a target base station using beamforming, precoding, and/or the like. Similarly, wireless access links between a UE and a base station may use millimeter waves and/or may be directed toward a target wireless node (e.g., a UE and/or a base station). In this way, inter-link interference may be reduced UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a non-terrestrial wireless communication device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In some aspects, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As shown in FIG. 1, the UE 120 may include a first communication manager 140. As described in more detail elsewhere herein, the first communication manager 140 may receive an observed environmental vector feedback configuration associated with a reporting procedure for reporting updates corresponding to at least one observed environmental vector that is based at least in part on one or more features associated with an environment of the client device, wherein the observed environmental vector comprises input for a first machine learning component that determines client specific parameters for use by a second machine learning component; and transmit an update corresponding to the at least one observed environmental vector based at least in part on the observed environmental vector feedback configuration. Additionally, or alternatively, the first communication manager 140 may perform one or more other operations described herein.

In some aspects, the base station 110 may include a second communication manager 150. As described in more detail elsewhere herein, the second communication manager 150 may transmit an observed environmental vector feedback configuration associated with a reporting procedure for reporting updates corresponding to at least one observed environmental vector that is based at least in part on one or more features associated with an environment of a client device, wherein the observed environmental vector comprises input for a first machine learning component that determines client specific parameters for use by a second machine learning component; and receive an update corresponding to the at least one observed environmental vector based at least in part on the observed environmental vector feedback configuration. Additionally, or alternatively, the second communication manager 150 may perform one or more other operations described herein.

As indicated above, FIG. 1 is provided merely as an example. Other examples may differ from what is described with regard to FIG. 1.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter. In some aspects, one or more components of UE 120 may be included in a housing.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports comprising RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein.

Controller/processor 240 of base station 110, controller/processor 280 of UE 120, and/or any other component(s) of FIG. 2 may perform one or more techniques associated with observed environmental vector feedback for wireless communication, as described in more detail elsewhere herein. For example, controller/processor 240 of base station 110, controller/processor 280 of UE 120, and/or any other component(s) of FIG. 2 may perform or direct operations of, for example, process 600 or FIG. 6, process 700 of FIG. 7, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 or FIG. 6, process 700 of FIG. 7, and/or other processes as described herein. In some aspects, executing instructions may include running the instructions, converting the instructions, compiling the instructions, and/or interpreting the instructions, among other examples.

In some aspects, a client (e.g., the UE 120) may include means for receiving an observed environmental vector feedback configuration associated with a reporting procedure for reporting updates corresponding to at least one observed environmental vector that is based at least in part on one or more features associated with an environment of the client device, wherein the observed environmental vector comprises input for a first machine learning component that determines client specific parameters for use by a second machine learning component; and means for transmitting an update corresponding to the at least one observed environmental vector based at least in part on the observed environmental vector feedback configuration. Additionally, or alternatively, the UE 120 may include means for performing one or more other operations described herein. In some aspects, such means may include the communication manager 140. Additionally, or alternatively, such means may include one or more other components of the UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, a server (e.g., the base station 110) may include means for transmitting an observed environmental vector feedback configuration associated with a reporting procedure for reporting updates corresponding to at least one observed environmental vector that is based at least in part on one or more features associated with an environment of a client device, wherein the observed environmental vector comprises input for a first machine learning component that determines client specific parameters for use by a second machine learning component; and means for receiving an update corresponding to the at least one observed environmental vector based at least in part on the observed environmental vector feedback configuration. Additionally, or alternatively, the base station 110 may include means for performing one or more other operations described herein. In some aspects, such means may include the communication manager 150. In some aspects, such means may include one or more other components of the base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided merely as an example. Other examples may differ from what is described with regard to FIG. 2.

Figure 3:
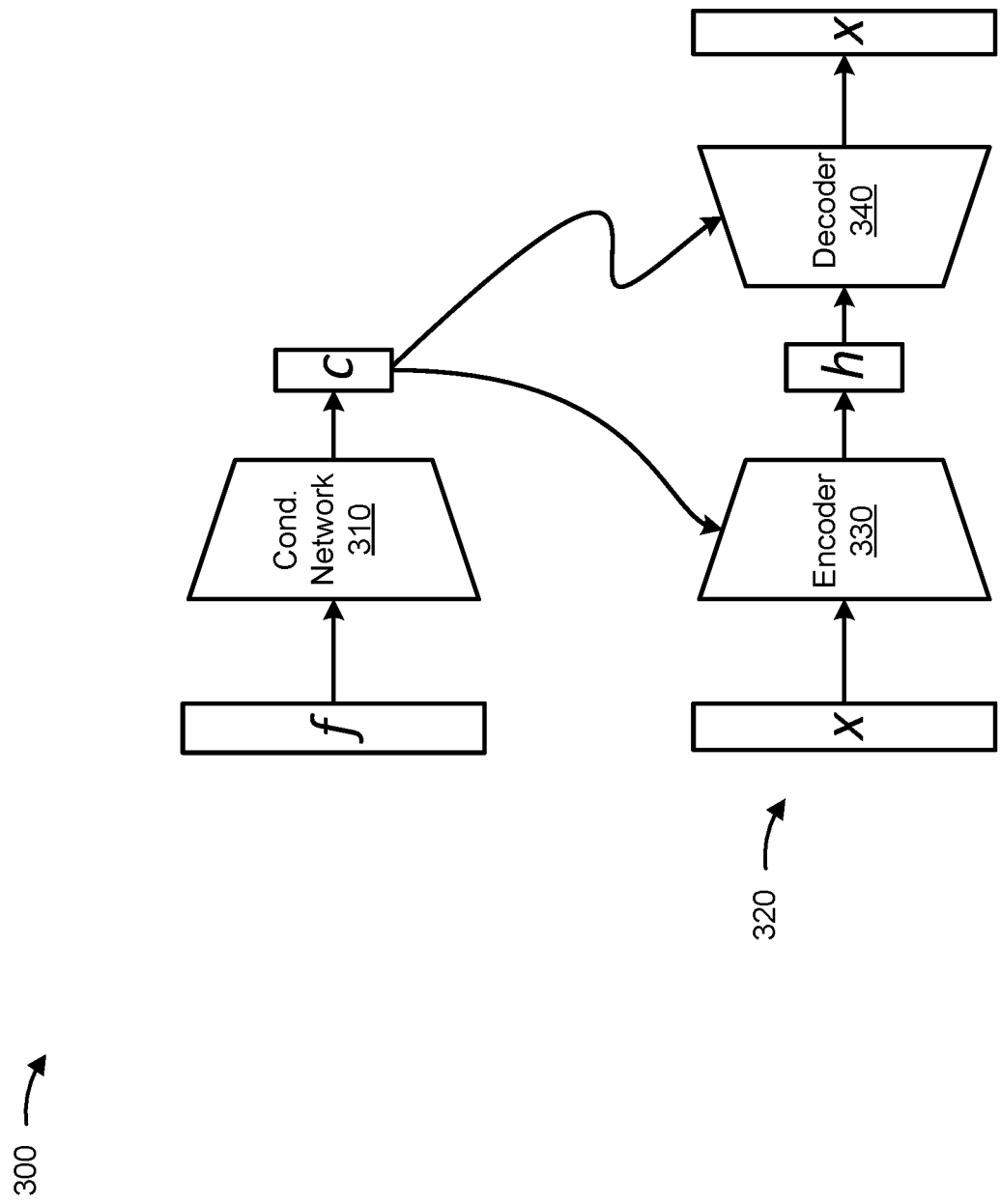
FIG. 3 is a diagram illustrating an example of a conditioning network and an autoencoder, in accordance with the present disclosure.

FIG. 3 is a diagram illustrating an example 300 of an autoencoder and an associated conditioning network, in accordance with the present disclosure. Aspects of the example 300 may be implemented by a client (e.g., the client 402 shown in FIG. 4), a server (e.g., the server 404 shown in FIG. 4), and/or the like.

The example 300 provides an example of a representation of a relationship between the client s, an observed wireless communication vector, x; a latent vector, h; an observed environmental vector, f, and a conditioning vector, c.

In some aspects, the latent vector h may be associated with a wireless communication task. In some aspects, the wireless communication task may include determining CSF, determining positioning information associated with the client, determining a modulation associated with a wireless communication, determining a waveform associated with a wireless communication, and/or the like.

For example, in some aspects, autoencoders may be used for compressing CSF for feeding back CSI to a server. In some aspects, the observed wireless communication vector x may comprise a propagation channel that the client (e.g., a UE 120) estimates based at least in part on a received channel state information reference signal (CSI-RS). The latent vector h may comprise compressed CSF to be fed back to a server (e.g., a base station 110).

As shown, a conditioning network (shown as "Cond. Network") 310 may be configured to receive an observed environmental vector, f, as input and to provide a conditioning vector, c, as output. In some aspects, the conditioning network 310 may be or include a neural network or a plurality of neural networks. The conditioning vector c may include client-specific parameters that may be loaded into one or more layers of an autoencoder 320. In some aspects, the autoencoder 320 may be or include a neural network or a plurality of neural networks. The autoencoder 320 may be a regular autoencoder or a variational autoencoder. The autoencoder 320 may include an encoder 330 configured to receive an observed wireless communication vector, x, as input and to provide a latent vector, h, as output. The autoencoder 320 also may include a decoder 340 configured to receive the latent vector h as input and to provide (e.g., recover) the observed wireless communication vector x as output.

In some aspects, the conditioning vector c from the conditioning network 310 may condition the autoencoder 320 to perform in the observed environment. The conditioning vector c may include the client-specific parameters for the encoder $\phi_c$ and the client-specific parameters for the decoder $\theta_c$. Thus, a set of encoder parameters may include the shared parameters $\phi$ and the client-specific parameters $\phi_c$. The set of decoder parameters may include the shared parameters $\theta$ and the client-specific parameters $\theta_c$. A set of neural network parameters may include parameters for the encoder, the decoder, and the conditioning network.

In some aspects, the observed environmental vector f may include any number of different types of information that a client may obtain about an environment of the client. Information about the environment of the client may include information about the client (e.g., device information, configuration information, capability information, and/or the like), information about a state associated with the client (e.g., an operation state, a power state, an activation state, and/or the like), information about the location of the client (e.g., positioning information, orientation information, geographical information, motion information, and/or the like), information about an environment surrounding the client (e.g., weather information, information about obstacles to wireless signals surrounding the client, information about materials in the vicinity of the client, and/or the like), and/or the like. The observed environmental vector f may be formed by concatenating one or more information indications such as those listed above.

In some aspects, for example, the observed environmental vector f may include a client identifier (ID), a client antenna configuration, a large scale channel characteristic, a CSI-RS configuration, an image obtained by an imaging device, a portion of an estimated propagation channel, and/or the like. In some aspects, for example, the large scale channel characteristic may indicate a delay spread associated with a channel, a power delay profile associated with a channel, a Doppler measurement associated with a channel, a Doppler spectrum associated with a channel, a signal to noise ratio (SNR) associated with a channel, a signal to noise plus interference ratio (SiNR) associated with a channel, a reference signal received power (RSRP), a received signal strength indicator (RSSI), and/or the like.

In some aspects, the conditioning network 310 and/or the autoencoder 320 may be trained using an unsupervised learning procedure. The conditioning network 310 and/or the autoencoder 320 may be trained using a federated learning procedure. Federated learning may be used to train the conditioning network 310 and/or the autoencoder 320.

As indicated above, during the training, autoencoders and conditioning networks may be collaboratively learned using the federated learning techniques. In some cases, a conditioning network may be learned and/or updated less frequently than a set of autoencoders. The conditioning network determines a conditioning vector based at least in part on an observed environmental vector. The observed environmental vector may include elements that do not change or that change infrequently (e.g., client identifiers, positioning information associated with an unmoving client, antenna identifiers, and other infrequency changing environmental information). As a result, a conditioning network may change infrequently and feeding back updates to the observed environmental vector to the server each time a latent vector is provided to the server may result in unnecessary consumption of communication resources.

Aspects of the techniques and apparatuses described herein may facilitate observed environmental vector feedback for autoencoders in wireless communication. In some aspects, a client may receive an observed environmental vector feedback configuration associated with a reporting procedure for reporting updates corresponding to at least one observed environmental vector that is based at least in part on one or more features associated with an environment of the client device. The client may determine an update corresponding to the at least one observed environmental vector and may transmit the update to a server based at least in part on the observed environmental vector feedback configuration. The observed environmental vector feedback configuration may configure the client to provide updates in a manner that reduces consumption of communication resources. In this way, aspects described herein may facilitate use of machine learning components without increasing resource consumption unnecessarily. Aspects of the techniques described herein may be used for any number of cross-node machine learning challenges including, for example, facilitating channel state feedback, facilitating positioning of a client, and/or learning of modulation and/or waveforms for wireless communication As indicated above, FIG. 3 is provided merely as an example. Other examples may differ from what is described with regard to FIG. 3.

FIG. 4 is a diagram illustrating an example 400 of wireless communication using an autoencoder and an associated conditioning network, in accordance with the present disclosure. As shown, a client 402 and a server 404 may communicate with one another. In some aspects, the client 402 and the server 404 may communicate with one another via a wireless network (e.g., the wireless network 100 shown in FIG. 1). In some aspects, more than one client 402 and/or more than one server 404 may communicate with one another.

The client 402 and/or the server 404 may be, be similar to, include, be included in, and/or be implemented using a computing device. The computing device may include, for example, a wireless communication device a network device (e.g., a wireless network device and/or wired network device), a portable computer, a laptop, a tablet, a workstation, a personal computer, a controller, an in-vehicle control network, an IoT device, a traffic control device, an IAB node, a UE, a base station, a relay station, a switch, a router, a CPE, a vehicle (e.g., land-based vehicles, aerial vehicles, non-terrestrial vehicles, and/or water-based vehicles), and/or any combination and/or For example, the client 402 may be a UE (e.g., UE 120 shown in FIG. 1) and the server 404 may be a base station (e.g., base station 110 shown in FIG. 1), and the client 402 and the server 404 may communicate via an access link. The client 402 and the server 404 may be UEs 120 that communicate via a sidelink.

As shown, the client 402 may include a first communication manager 406 (e.g., the first communication manager 140 shown in FIG. 1) that may be configured to utilize a client conditioning network (shown as "Cond. Network") 408 and a client autoencoder 410 to perform one or more wireless communication tasks. In some aspects, the client conditioning network 408 may be, be similar to, include, or be included in, the conditioning network 310 shown in FIG. 3 and described above. In some aspects, the client autoencoder 410 may be, be similar to, include, or be included in, the autoencoder 320 shown in FIG. 3 and described above.

As shown, the client conditioning network 408 may be configured to receive an observed environmental vector, f, as input and to provide a conditioning vector, c, as output. The conditioning vector c may include a set of client-specific encoder parameters, a set of client-specific decoder parameters, and/or the like. In some aspects, the client conditioning network 408 may include a first sub-network configured to determine the set of client-specific encoder parameters, a second sub-network configured to determine the set of client-specific decoder parameters, and/or the like.

As shown, the client autoencoder 410 may include an encoder 412 configured to receive an observed wireless communication vector x as input and to provide a latent vector, h, as output. The encoder may include at least one encoder layer configured to use the set of client-specific encoder parameters determined by the client conditioning network 408. The client 402 may determine the latent vector by mapping the observed wireless communication vector x to the latent vector h using the at least one encoder layer. The at least one encoder layer may include a first set of layers that uses a first subset of the set of client-specific encoder parameters, a second set of layers that uses a first subset of a set of shared encoder parameters, a third set of layers that uses a second subset of the set of client-specific encoder parameters and a second subset of the set of shared encoder parameters, and/or the like.

The client autoencoder 410 also may include a decoder 414 configured to receive the latent vector h as input and to provide the observed wireless communication vector x as output. The decoder may include at least one decoder layer configured to use a set of client-specific decoder parameters. The client 402 may determine the observed wireless communication vector x by mapping the latent vector h to the observed wireless communication vector x using the at least one decoder layer. The client 402 may map the latent vector h to the observed wireless communication vector x using a set of decoder parameters. The set of decoder parameters may include the set of client-specific decoder parameters and a set of shared decoder parameters. The at least one decoder layer may include a first set of layers that uses a first subset of the set of client-specific decoder parameters, a second set of layers that uses a first subset of the set of shared decoder parameters, a third set of layers that uses a second subset of the set of client-specific decoder parameters and a second subset of the set of shared decoder parameters, and/or the like.

As shown in FIG. 4, the server 404 may include a second communication manager 416 (e.g., the second communication manager 150) that may be configured to utilize a server conditioning network (shown as "Cond. Network") 418 to perform one or more wireless communication tasks. For example, in some aspects, the server conditioning network 418 may correspond to the client conditioning network 408. In some aspects, the server conditioning network 418 may be a copy of the client conditioning network 408. In some aspects, the server conditioning network 418 may be, be similar to, include, or be included in, the conditioning network 310 shown in FIG. 3 and described below.

As shown, the server conditioning network 418 may be configured to receive an observed environmental vector, f, as input and to provide a conditioning vector, c, as output. The conditioning vector c may include a set of client-specific encoder parameters, a set of client-specific decoder parameters, and/or the like. In some aspects, the server conditioning network 418 may include a first sub-network configured to determine the set of client-specific encoder parameters, a second sub-network configured to determine the set of client-specific decoder parameters, and/or the like.

In some aspects, the server 404 may include a server autoencoder 420. The server autoencoder 420 may include an encoder 422 configured to receive the observed wireless communication vector x as input and to provide the latent vector h as output. The server autoencoder 420 also may include a decoder 424 configured to receive the latent vector h as input and to provide the observed wireless communication vector x as output. The encoder 422 may include at least one encoder layer configured to use the set of client-specific encoder parameters. The decoder 424 may include at least one decoder layer configured to use a set of client-specific decoder parameters.

The decoder 424 is configured to determine the observed wireless communication vector x by mapping the latent vector h to the observed wireless communication vector x using the at least one decoder layer. The server 404 may map the latent vector h to the observed wireless communication vector x using a set of decoder parameters. The set of decoder parameters may include a set of client-specific decoder parameters and a set of shared decoder parameters. The at least one decoder layer may include a first set of layers that uses a first subset of the set of client-specific decoder parameters, a second set of layers that uses a first subset of the set of shared decoder parameters, a third set of layers that uses a second subset of the set of client-specific decoder parameters and a second subset of the set of shared decoder parameters, and/or the like.

As shown in FIG. 4, the client 402 may include a transceiver (shown as "Tx/Rx") 426 that may facilitate wireless communications with a transceiver 428 of the server 404. As shown by reference number 430, for example, the server 404 may transmit an observed environmental vector feedback configuration to the client 402. The observed environmental vector feedback configuration may be associated with a reporting procedure for reporting updates corresponding to at least one observed environmental vector that is based at least in part on one or more features associated with an environment of the client.

In some aspects, the client 402 may determine an update corresponding to the at least one observed environmental vector. As shown by reference number 432, the client 402 may transmit, and the server 404 may receive, the update. The client 402 may transmit the update based at least in part on the observed environmental vector feedback configuration.

As shown by reference number 434, the server 404 may transmit, using the transceiver 428, a wireless communication to the client 402. The wireless communication may include, for example, a reference signal such as a CSI-RS. The transceiver 426 of the client 402 may receive the wireless communication. The communication manager 406 may determine an observed wireless communication vector x based at least in part on the wireless communication. For example, in aspects in which the wireless communication is a CSI-RS, the observed wireless communication vector x may include channel state information (CSI).

As shown, the communication manager 406 may obtain an observed environmental vector, f, and provide the observed environmental vector f to the conditioning network 408. The communication manager 406 may obtain the observed environmental vector from memory, from one or more sensors, and/or the like. As shown, the client conditioning network may determine, based at least in part on the observed environmental vector f a conditioning vector, c. The first communication manager 406 may load client-specific autoencoder parameters from the conditioning vector c into the client autoencoder 410. The first communication manager 406 may provide the observed wireless communication vector x as input to the encoder 412 of the client autoencoder 410. The encoder 412 of the client autoencoder 410 may determine a latent vector, h, based at least in part on the observed wireless communication vector x.

As shown by reference number 436, the communication manager 406 may provide the latent vector h and the observed environmental vector f to the transceiver 426 for transmission. As shown by reference number 438, the transceiver 426 may transmit, and the transceiver 428 of the server 404 may receive, the observed environmental vector f and the latent vector h. As shown, the second communication manager 416 of the server 404 may provide the observed environmental vector f as input to the server conditioning network 418, which may determine a conditioning vector c. The second communication manager 416 may load client-specific decoder parameters from the conditioning vector c into one or more layers of the decoder 424 of the server autoencoder 420.

The decoder 424 may determine (e.g., reconstruct) the observed wireless communication vector x based at least in part on the latent vector h. In some aspects, the server 404 may perform a wireless communication action based at least in part on the observed wireless communication vector x. For example, in aspects in which the observed wireless communication vector x comprises CSI, the communication manager 418 of the server 404 may use the CSI for communication grouping and/or beamforming.

In some aspects, a client 402 and/or a server 404 may perform one or more additional operations. A client 402 and/or a server 404 may be configured, for example, to use one or more different types of machine learning components, to use one or more procedures and/or components in addition to, or in lieu of one or more machine learning components. For example, in some aspects, a client 402 and/or a server 404 may be configured to perform a first type of procedure in connection with a received signal and to perform a second type of procedure in connection with the received signal and/or another received signal. The first type of procedure may be performed using a first algorithm, a first processing block, and/or a first machine learning component, and the second type of procedure may be performed using a second algorithm, a second processing block, and/or a second machine learning component. In an example, a client 402 may determine a first CSI associated with a received signal using a first procedure and may determine a second CSI associated with the received signal and/or a different received signal using a second procedure.

As indicated above, FIG. 4 is provided merely as an example. Other examples may differ from what is described with regard to FIG. 4.

Figure 5:
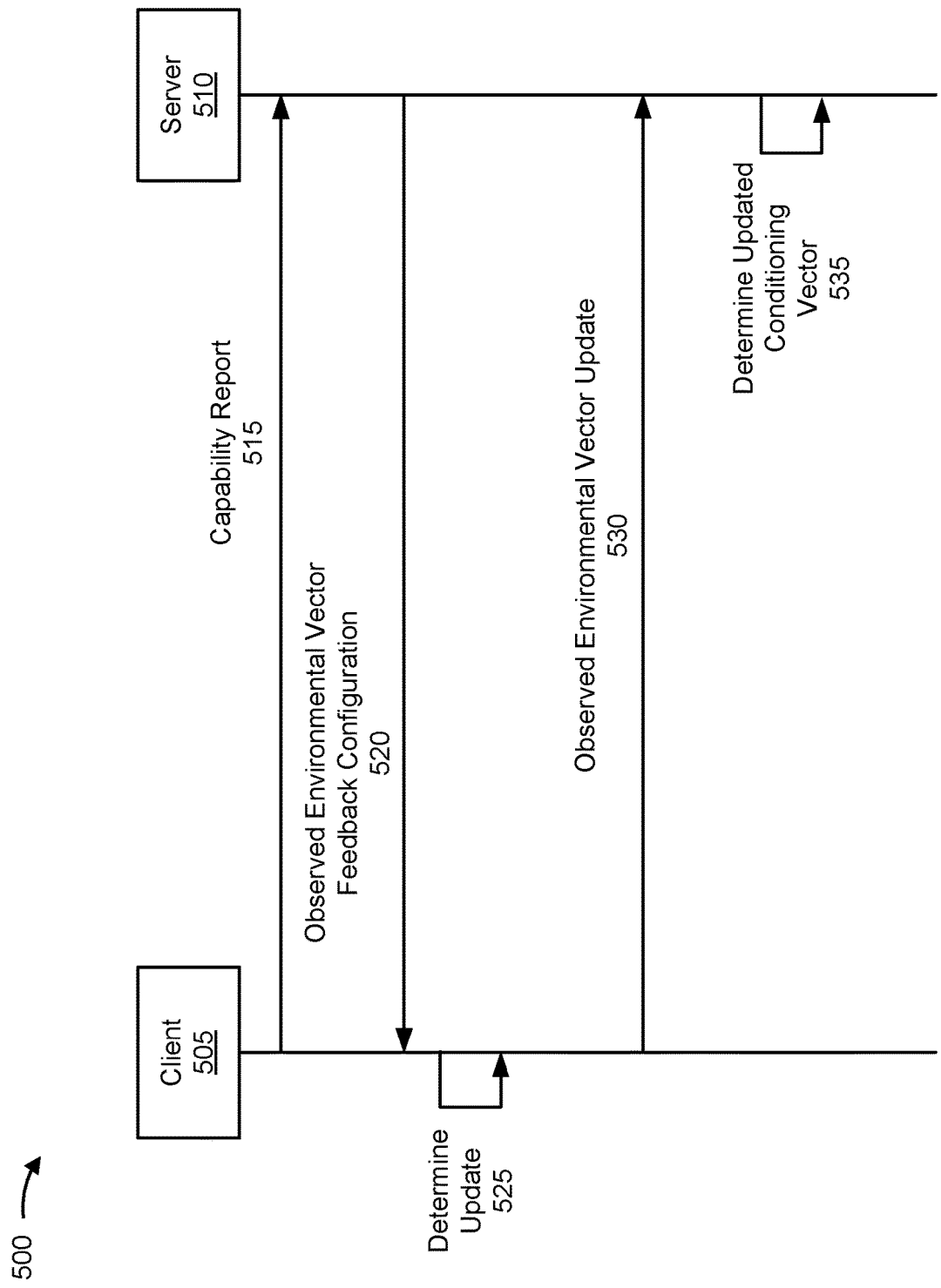
FIG. 5 is a diagram illustrating an example of observed environmental vector feedback in wireless communication, in accordance with the present disclosure.

FIG. 5 is a diagram illustrating an example 500 of observed environmental vector feedback for wireless communication, in accordance with the present disclosure. As shown, a client 505 and a server 510 may communicate with one another. In some aspects, the client 505 may be, be similar to, include, or be included in the client 402 shown in FIG. 4. In some aspects, the server 510 may be, be similar to, include, or be included in the server 404 shown in FIG. 4.

As shown by reference number 515, the client 505 may transmit, and the server 510 may receive, a capability report. The capability report may indicate a one or more capabilities of the client 505. For example, the capability report may indicate a number of observed environmental vectors that the client 505 can support. The number of observed environmental vectors that the client 505 can support may include the number of observed environmental vectors that the client 505 is capable of processing, updating, and/or tracking simultaneously.

For example, the client 505 may support at least one observed environmental vector. The at least one observed environmental vector may include a plurality of observed environmental vectors. The plurality of observed environmental vectors may correspond to a plurality of communication parameters. In some aspects, for example, a first observed environmental vector of the plurality of observed environmental vectors may correspond to a first communication parameter of the plurality of communication parameters, and a second observed environmental vector of the plurality of observed environmental vectors may correspond to a second communication parameter of the plurality of communication parameters. The plurality of communication parameters may indicate at least one of a component carrier, a bandwidth part, a band, a band combination, a frequency range, a use case, a neural network identifier, or a combination thereof. The use case may include at least one of a CSI derivation, a positioning measurement derivation, demodulation of a data channel, or a combination thereof.

As shown by reference number 520, the server 510 may transmit, and the client 505 may receive, an observed environmental vector feedback configuration. The observed environmental vector feedback configuration may be associated with a reporting procedure for reporting updates corresponding to at least one observed environmental vector. The at least one observed environmental vector may be based at least in part on one or more features associated with an environment of the client 505. In some aspects, the observed environmental vector feedback configuration may be based at least in part on the capability report. In some aspects, the server 510 may transmit, and the client 505 may receive, an autoencoder configuration that indicates a number of autoencoders to be included in the set of autoencoders.

As shown by reference number 525, the client 505 may determine an update corresponding to the at least one observed environmental vector. As shown by reference number 530, the client 505 may transmit, and the server 510 may receive, the update corresponding to the observed environmental vector (shown as observed environmental vector update). As shown by reference number 535, the server may determine an updated conditioning vector based at least in part on the update.

In some aspects, the client 505 may determine the update by determining a set of values corresponding to the at least one observed environmental vector. In some aspects, the update includes a locally updated observed environmental vector. The update may include a subset of elements of a locally updated observed environmental vector that is different than a corresponding subset of elements of a previously transmitted update.

The observed environmental vector configuration may indicate at least one transmission parameter that indicates a quantity of scheduled uplink resources that can be used to carry one or more portions of the update. The quantity of the scheduled uplink resources may correspond to a percentage of a set of allocated uplink resources. The set of allocated uplink resources may correspond to at least one of a physical uplink control channel (PUCCH), a physical uplink shared channel (PUSCH), or a combination thereof. In some aspects, the set of allocated uplink resources may correspond to the PUCCH. The set of allocated uplink resources may correspond to an uplink control information (UCI) report.

The update may include a conditioning network input indication that indicates one or more elements of the at least one observed environmental vector that are to be provided to a server conditioning network as input for determining a conditioning vector. The conditioning network input indication may include one or more indices corresponding to the one or more elements. For example, the conditioning network input indication may include a bitmap that indicates the one or more indices. The update may include a first part including the conditioning network input indication; and a second part including a set of values corresponding to the at least one observed environmental vector.

The client 505 may transmit the update by transmitting the first part using a physical uplink control channel and transmitting the second part using a physical uplink shared channel. The client 505 may transmit the update by transmitting the first part using a UCI report and the second part using the UCI report. The first part may include a bitmap.

In some aspects, the client 505 may identify a collision between a scheduled transmission of the plurality of updates corresponding to the plurality of observed environmental vectors and an additional transmission. The client 505 may refrain from transmitting an end portion of a report comprising the plurality of updates corresponding to the plurality of observed environmental vectors based at least in part on identifying the collision. In some aspects, the client 505 may receive a resource allocation associated with a scheduled transmission of the plurality of updates corresponding to the plurality of observed environmental vectors and an additional transmission. The client 505 may determine that the resource allocation is insufficient to transmit a report comprising the plurality of updates corresponding to the plurality of observed environmental vectors. The client 505 may refrain from transmitting an end portion of the report based at least in part on determining that the resource allocation is insufficient to transmit the report.

In some aspects, the client 505 may be configured to provide periodic feedback of a latent vector. In some aspects, feedback of the update corresponding to the observed environmental vector may be configured in relation to the periodic feedback corresponding to the latent vector. For example, in some aspects, the client 505 may receive (e.g., from the server 510) a latent vector configuration that indicates a periodic reporting procedure for reporting updates corresponding to at least one latent vector. The latent vector configuration may be carried in at least one of a radio resource control (RRC) message, a MAC CE, or a combination thereof.

The observed environmental vector configuration may indicate a second periodicity associated with reporting the updates corresponding to the at least one observed environmental vector. The second periodicity may include an amount of time between consecutive transmissions of the updates corresponding to the at least one observed environmental vector. The first periodicity may be shorter than the second periodicity.

In some aspects, the second periodicity may be defined using a scaling factor based at least in part on the first periodicity. For example, the latent vector configuration may indicate a first periodicity associated with reporting updates corresponding to the at least one latent vector and a scaling factor for determining a second periodicity relative to the first periodicity. The second periodicity may include an amount of time between consecutive transmissions of the updates corresponding to the at least one observed environmental vector. In some aspects, the client 505 may determine the second periodicity based at least in part on the first periodicity and the scaling factor. The client 505 may transmit, and the server 510 may receive, an indication of the second periodicity.

The scaling factor may include an explicit scaling factor. That is, for example, the selection feedback configuration may include a scaling factor table that maps the first periodicity to one or more second periodicity options. The client 505 may select the second periodicity from the one or more second periodicity options. For example, in the CSI-Reporting scenario, the configuration may include a single periodicity for reporting the latent vector h, and an explicit or implicit scaling factor to determine the reduced periodicity of the reporting of the at least one observed environmental vector. An explicit scaling factor may correspond to a factor, $\alpha=\{0.1, 0.2, 0.5, 0.75\}$ in the configuration. A table maps each periodicity, T, of the latent vector h to a different periodicity of the observed environmental vector f update. For example, if $T_h=100$ milliseconds, then $T_f=\{10, 20, 50\}$", then the client 505 can pick the value and report it to the server 510. In some aspects, the scaling factor may include an implicit scaling factor, in which the first periodicity maps to the second periodicity.

The client 505 may identify a collision between a scheduled transmission of an update corresponding to the at least one latent vector and a scheduled transmission of an update corresponding to the at least one observed environmental vector. The client 505 may transmit the scheduled transmission of the update corresponding to the at least one observed environmental vector based at least in part on identifying the collision.

In some aspects, the at least one observed environmental vector may include a plurality of observed environmental vectors. The at least one latent vector may include a plurality of latent vectors, and the client 505 may transmit, according to an ordering, a first plurality of updates. The first plurality of updates may correspond to the plurality of observed environmental vectors and the client 505 may transmit, according to the ordering, a second plurality of updates that correspond to the plurality of latent vectors.

In some aspects, transmitting the first plurality of updates and the second plurality of updates according to the ordering may include transmitting the first plurality of updates prior to transmitting the second plurality of updates. In some aspects, transmitting the first plurality of updates and the second plurality of updates according to the ordering may include transmitting a first update of the first plurality of updates; transmitting, after transmitting the first update, a second update of the second plurality of updates; transmitting, after transmitting the second update, a third update of the first plurality of updates; and transmitting, after transmitting the third update, a fourth update of the second plurality of updates.

In some aspects, the at least one observed environmental vector may include a plurality of elements. The at least one latent vector may include a plurality of latent vectors, and the client 505 may transmit, according to an ordering, a first plurality of updates. The first plurality of updates may correspond to the plurality of elements and the client 505 may transmit, according to the ordering, a second plurality of updates that correspond to the plurality of latent vectors.

In some aspects, transmitting the first plurality of updates and the second plurality of updates according to the ordering may include transmitting the first plurality of updates prior to transmitting the second plurality of updates. In some aspects, transmitting the first plurality of updates and the second plurality of updates according to the ordering may include transmitting a first update of the first plurality of updates; transmitting, after transmitting the first update, a second update of the second plurality of updates; transmitting, after transmitting the second update, a third update of the first plurality of updates; and transmitting, after transmitting the third update, a fourth update of the second plurality of updates.

In some aspects, the client 505 may identify a collision between a scheduled transmission of a plurality of updates corresponding to a plurality of observed environmental vectors and an additional transmission The client 505 may refrain from transmitting an end portion of a report comprising the plurality of updates corresponding to the plurality of observed environmental vectors based at least in part on identifying the collision.

In some aspects, the client 505 may receive a resource allocation associated with a scheduled transmission of the plurality of updates corresponding to the plurality of observed environmental vectors and an additional transmission and may determine that the resource allocation is insufficient to transmit a report comprising the plurality of updates corresponding to the plurality of autoencoder indexes. The client 505 may refrain from transmitting an end portion of the report based at least in part on determining that the resource allocation is insufficient to transmit the report.

In some aspects, the customization feature vector configuration may include an indication to transmit the update corresponding to the at least one observed environmental vector based at least in part on receiving a latent vector feedback request. The latent vector feedback request may be carried in at least one of a downlink control information (DCI) transmission, a MAC CE, or a combination thereof. In some aspects, the latent vector feedback request may include a trigger that triggers transmission of an update corresponding to the at least one latent vector, and the trigger further may trigger transmission of the update corresponding to the at least one observed environmental vector.

In some aspects, the client 505 may transmit, to the server 510, a feedback resource request, wherein the feedback resource request comprises a request for a first set of resources for transmitting the update corresponding to the at least one latent vector. The feedback resource request may include a request for a second set of resources for transmitting the update corresponding to the at least one observed environmental vector.

In some aspects, the client 505 may determine an occurrence of an update reporting trigger event and may transmit, based at last on determining the occurrence of the update reporting trigger event, at least one of the update corresponding to the at least one observed environmental vector or the update corresponding to the at least one latent vector.

In some aspects, the client 505 may determine the update corresponding to the at least one latent vector by determining a locally updated latent vector based at least in part on a previously reported observed environmental vector. The client 505 may determine the update corresponding to the at least one latent vector by determining a locally updated latent vector based at least in part on a default observed environmental vector. The default autoencoder index include an initial observed environmental vector that was determined at an initialization phase and/or a setup phase.

In some aspects, the client 505 may quantize the locally updated observed environmental vector to generate a quantized update and transmit the quantized update. The locally updated observed environmental vector may include a plurality of elements and the client 505 may quantize each of the plurality of elements. In some aspects, the client 505 may determine an indication of a bit size corresponding to the quantized update. The server 510 may provide an indication of the bit size. The indication of the bit size may be carried in at least one of the observed environmental vector configuration, an RRC message, a DCI transmission, a MAC CE, or a combination thereof. In some aspects, the client 505 may retrieve the indication from memory. The quantized update may include a fixed bit number that corresponds to the bit size.

The client 505 may determine an indication of a maximum bit size corresponding to the quantized update. The quantized update may include a variable bit number that includes a bit size that is less than or equal to the maximum bit size. The client 505 may transmit a quantization capability indication that indicates a maximum bit size for quantization of customization feature vector updates and the maximum bit size may be based at least in part on the quantization capability indication. The client 505 may receive a resource allocation for transmitting the update and the maximum bit size may be based at least in part on the resource allocation. The server 510 may provide an indication of the maximum bit size. The indication of the maximum bit size may be carried in at least one of the observed environmental vector configuration, an RRC message, a DCI transmission, a MAC CE, or a combination thereof. In some aspects, the client 505 may retrieve the indication from memory.

The quantized update may include a non-uniform quantization of one or more elements of the locally updated observed environmental vector. In some aspects, the client 505 may receive an indication of a non-uniform quantization scheme. The non-uniform quantization may be based at least in part on the indication of the non-uniform quantization scheme. The non-uniform quantization scheme may be carried in at least one of the observed environmental vector configuration, an RRC message, a DCI transmission, a MAC CE, or a combination thereof. The client 505 may transmit a non-uniform quantization capability indication and the non-uniform quantization scheme may be based at least in part on the non-uniform quantization capability indication. In some aspects, the client 505 may transmit a non-uniform quantization suggestion and the non-uniform quantization scheme may be based at least in part on the non-uniform quantization suggestion.

As indicated above, FIG. 5 is provided merely as an example. Other examples may differ from what is described with regard to FIG. 5.

Figure 6:
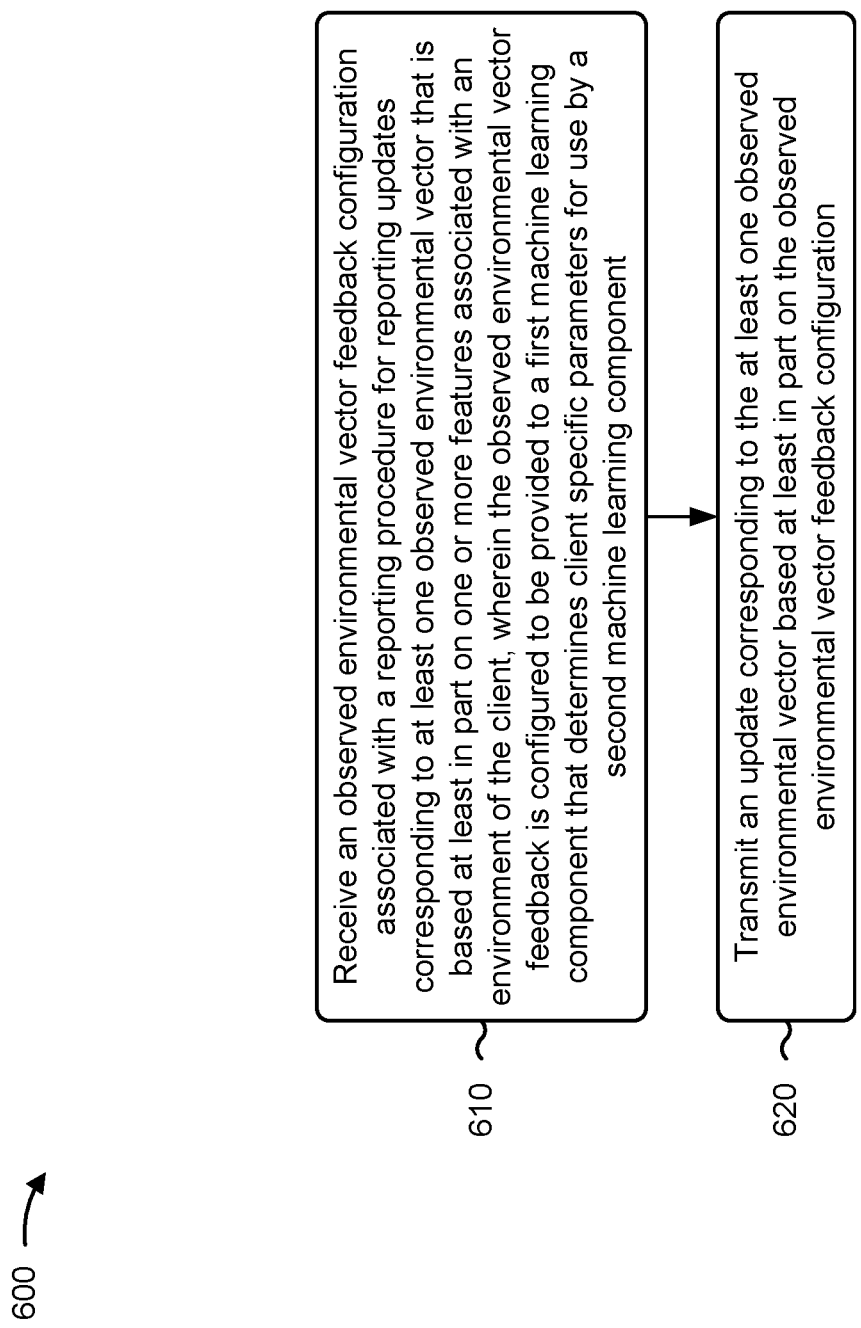
FIGS. 6 and 7 are diagrams illustrating example processes associated with observed environmental vector feedback in wireless communication, in accordance with the present disclosure.

FIG. 6 is a diagram illustrating an example process 600 performed, for example, by a client, in accordance with the present disclosure. Example process 600 is an example where the client (e.g., client 505 shown in FIG. 5) performs operations associated with observed environmental vector feedback for wireless communication.

As shown in FIG. 6, in some aspects, process 600 may include receiving an observed environmental vector feedback configuration associated with a reporting procedure for reporting updates corresponding to at least one observed environmental vector that is based at least in part on one or more features associated with an environment of the client, wherein the observed environmental vector comprises input for a first machine learning component that determines client specific parameters for use by a second machine learning component (block 610). For example, the client (e.g., using reception component 802, depicted in FIG. 8) may receive an observed environmental vector feedback configuration associated with a reporting procedure for reporting updates corresponding to at least one observed environmental vector that is based at least in part on one or more features associated with an environment of the client, wherein the observed environmental vector comprises input for a first machine learning component that determines client specific parameters for use by a second machine learning component, as described above.

As further shown in FIG. 6, in some aspects, process 600 may include transmitting an update corresponding to the at least one observed environmental vector based at least in part on the observed environmental vector feedback configuration (block 620). For example, the client (e.g., using transmission component 806, depicted in FIG. 8) may transmit an update corresponding to the at least one observed environmental vector based at least in part on the observed environmental vector feedback configuration, as described above.

Process 600 may include additional aspects, such as any single aspect or any combination of aspects described below and/or in connection with one or more other processes described elsewhere herein.

In a first aspect, the first machine learning component comprises a first neural network.

In a second aspect, alone or in combination with the first aspect, the first neural network comprises a conditioning network.

In a third aspect, alone or in combination with one or more of the first and second aspects, the second machine learning component comprises a second neural network.

In a fourth aspect, alone or in combination with one or more of the first through third aspects, the second neural network comprises an autoencoder.

In a fifth aspect, alone or in combination with one or more of the first through fourth aspects, the at least one observed environmental vector comprises one or more elements, wherein the one or more elements indicate at least one of a client vendor identifier (ID), a client ID, a radio network temporary ID, a client antenna configuration, a client interference level, a panel ID, a reception beam ID, a large scale channel characteristic, a channel state information reference signal configuration, a serving cell ID, imaging data associated with an image obtained by an imaging device associated with the client, an element of an observed wireless communication vector, or a combination thereof.

In a sixth aspect, alone or in combination with one or more of the first through fifth aspects, the client ID comprises at least one of an international mobile equipment identity, an international mobile subscriber identity, or a combination thereof.

In a seventh aspect, alone or in combination with one or more of the first through sixth aspects, the large scale channel characteristic indicates at least one of a delay spread associated with a channel, a power delay profile associated with a channel, a Doppler measurement associated with a channel, a Doppler spectrum associated with a channel, a signal to noise ratio associated with a channel, a signal to noise plus interference ratio associated with a channel, a reference signal received power, a received signal strength indicator, or a combination thereof.

In an eighth aspect, alone or in combination with one or more of the first through seventh aspects, process 600 includes determining the update by determining a set of values corresponding to the at least one observed environmental vector.

In a ninth aspect, alone or in combination with one or more of the first through eighth aspects, the update comprises a locally updated observed environmental vector.

In a tenth aspect, alone or in combination with one or more of the first through ninth aspects, the update comprises a subset of elements of a locally updated observed environmental vector that are different than a corresponding subset of elements of a previously transmitted update.

In an eleventh aspect, alone or in combination with one or more of the first through tenth aspects, the at least one observed environmental vector comprises a plurality of observed environmental vectors.

In a twelfth aspect, alone or in combination with one or more of the first through eleventh aspects, the plurality of observed environmental vectors corresponds to a plurality of communication parameters.

In a thirteenth aspect, alone or in combination with one or more of the first through twelfth aspects, the plurality of communication parameters indicate at least one of a component carrier, a bandwidth part, a band, a band combination, a frequency range, a use case, a neural network identifier, or a combination thereof.

In a fourteenth aspect, alone or in combination with one or more of the first through thirteenth aspects, the use case comprises at least one of a channel state information derivation, a positioning measurement derivation, demodulation of a data channel, or a combination thereof.

In a fifteenth aspect, alone or in combination with one or more of the first through fourteenth aspects, a first observed environmental vector of the plurality of observed environmental vectors corresponds to a first communication parameter of the plurality of communication parameters, and wherein a second observed environmental vector of the plurality of observed environmental vectors corresponds to a second communication parameter of the plurality of communication parameters.

In a sixteenth aspect, alone or in combination with one or more of the first through fifteenth aspects, process 600 includes transmitting a capability report that indicates a number of observed environmental vectors that the client can support, wherein the observed environmental vector configuration is based at least in part on the capability report.

In a seventeenth aspect, alone or in combination with one or more of the first through sixteenth aspects, transmitting the update comprises transmitting the update using at least one of an uplink MAC CE, an RRC message, a UCI report, or a combination thereof.

In an eighteenth aspect, alone or in combination with one or more of the first through seventeenth aspects, the observed environmental vector configuration indicates at least one transmission parameter that indicates a quantity of scheduled uplink resources that can be used to carry one or more portions of the update.

In a nineteenth aspect, alone or in combination with one or more of the first through eighteenth aspects, the quantity of the scheduled uplink resources corresponds to a percentage of a set of allocated uplink resources.

In a twentieth aspect, alone or in combination with one or more of the first through nineteenth aspects, the set of allocated uplink resources correspond to at least one of a physical uplink control channel (PUCCH), a physical uplink shared channel (PUSCH), or a combination thereof.

In a twenty-first aspect, alone or in combination with one or more of the first through twentieth aspects, the set of allocated uplink resources correspond to the PUCCH, and wherein the set of allocated uplink resources correspond to an uplink control information report.

In a twenty-second aspect, alone or in combination with one or more of the first through twenty-first aspects, the update comprises a conditioning network input indication that indicates one or more elements of the at least one observed environmental vector that are to be provided to a conditioning network as input for determining a conditioning vector.

In a twenty-third aspect, alone or in combination with one or more of the first through twenty-second aspects, the conditioning network input indication comprises one or more indices corresponding to the one or more elements.

In a twenty-fourth aspect, alone or in combination with one or more of the first through twenty-third aspects, the conditioning network input indication comprises a bitmap that indicates the one or more indices.

In a twenty-fifth aspect, alone or in combination with one or more of the first through twenty-fourth aspects, the update comprises a first part comprising the conditioning network input indication, and a second part comprising a set of values corresponding to the at least one observed environmental vector.

In a twenty-sixth aspect, alone or in combination with one or more of the first through twenty-fifth aspects, transmitting the update comprises transmitting the first part using a physical uplink control channel, and transmitting the second part using a physical uplink shared channel.

In a twenty-seventh aspect, alone or in combination with one or more of the first through twenty-sixth aspects, transmitting the update comprises transmitting the first part using a UCI report, wherein the first part comprises a bitmap, and transmitting the second part using the UCI report.

In a twenty-eighth aspect, alone or in combination with one or more of the first through twenty-seventh aspects, process 600 includes receiving a latent vector configuration that indicates a periodic reporting procedure for reporting updates corresponding to at least one latent vector, determining, using at least one autoencoder, an update corresponding to the at least one latent vector, and transmitting the update corresponding to the at least one latent vector based at least in part on the latent vector configuration.

In a twenty-ninth aspect, alone or in combination with one or more of the first through twenty-eighth aspects, the latent vector configuration indicates a first periodicity associated with reporting updates corresponding to the at least one latent vector, wherein the first periodicity comprises an amount of time between consecutive transmissions of the updates corresponding to the at least one latent vector, and wherein the observed environmental vector configuration indicates a second periodicity associated with reporting the updates corresponding to the at least one observed environmental vector, wherein the second periodicity comprises an amount of time between consecutive transmissions of the updates corresponding to the at least one observed environmental vector.

In a thirtieth aspect, alone or in combination with one or more of the first through twenty-ninth aspects, the first periodicity is shorter than the second periodicity.

In a thirty-first aspect, alone or in combination with one or more of the first through thirtieth aspects, the latent vector configuration or the observed environmental vector configuration, or a combination thereof, is carried in at least one of an RRC message, a MAC CE, or a combination thereof.

In a thirty-second aspect, alone or in combination with one or more of the first through thirty-first aspects, the latent vector configuration indicates a first periodicity associated with reporting updates corresponding to the at least one latent vector, wherein the first periodicity comprises an amount of time between consecutive transmissions of the updates corresponding to the at least one latent vector, and wherein the observed environmental vector configuration indicates a scaling factor for determining a second periodicity relative to the first periodicity, wherein the second periodicity comprises an amount of time between consecutive transmissions of the updates corresponding to the at least one observed environmental vector.

In a thirty-third aspect, alone or in combination with one or more of the first through thirty-second aspects, process 600 includes determining the second periodicity based at least in part on the first periodicity and the scaling factor.

In a thirty-fourth aspect, alone or in combination with one or more of the first through thirty-third aspects, process 600 includes transmitting an indication of the second periodicity.

In a thirty-fifth aspect, alone or in combination with one or more of the first through thirty-fourth aspects, the scaling factor comprises an explicit scaling factor.

In a thirty-sixth aspect, alone or in combination with one or more of the first through thirty-fifth aspects, the observed environmental vector configuration comprises a scaling factor table that maps the first periodicity to one or more second periodicity options.

In a thirty-seventh aspect, alone or in combination with one or more of the first through thirty-sixth aspects, process 600 includes selecting the second periodicity from the one or more second periodicity options.

In a thirty-eighth aspect, alone or in combination with one or more of the first through thirty-seventh aspects, the scaling factor comprises an implicit scaling factor, wherein the first periodicity maps to the second periodicity.

In a thirty-ninth aspect, alone or in combination with one or more of the first through thirty-eighth aspects, process 600 includes identifying a collision between a scheduled transmission of an update corresponding to the at least one latent vector and a scheduled transmission of an update corresponding to the at least one observed environmental vector, and transmitting the scheduled transmission of the update corresponding to the at least one observed environmental vector based at least in part on identifying the collision.

In a fortieth aspect, alone or in combination with one or more of the first through thirty-ninth aspects, the at least one observed environmental vector comprises a plurality of observed environmental vectors and the at least one latent vector comprises a plurality of latent vectors, and wherein transmitting the update comprises transmitting, according to an ordering, a first plurality of updates that correspond to the plurality of observed environmental vectors, and transmitting, according to the ordering, a second plurality of updates that correspond to the plurality of latent vectors.

In a forty-first aspect, alone or in combination with one or more of the first through fortieth aspects, transmitting the first plurality of updates and the second plurality of updates according to the ordering comprises transmitting the first plurality of updates prior to transmitting the second plurality of updates.

In a forty-second aspect, alone or in combination with one or more of the first through forty-first aspects, transmitting the first plurality of updates and the second plurality of updates according to the ordering comprises transmitting a first update of the first plurality of updates, transmitting, after transmitting the first update, a second update of the second plurality of updates, transmitting, after transmitting the second update, a third update of the first plurality of updates, and transmitting, after transmitting the third update, a fourth update of the second plurality of updates.

In a forty-third aspect, alone or in combination with one or more of the first through forty-second aspects, the at least one observed environmental vector comprises a plurality of elements, and wherein the observed environmental vector configuration indicates an ordering associated with transmitting a plurality of updates corresponding to the plurality of elements.

In a forty-fourth aspect, alone or in combination with one or more of the first through forty-third aspects, the at least one observed environmental vector comprises a plurality of elements and the at least one latent vector comprises a plurality of latent vectors, and wherein transmitting the update comprises transmitting, according to an ordering, a first plurality of updates that correspond to the plurality of elements, and transmitting, according to the ordering, a second plurality of updates that correspond to the plurality of latent vectors.

In a forty-fifth aspect, alone or in combination with one or more of the first through forty-fourth aspects, transmitting the first plurality of updates and the second plurality of updates according to the ordering comprises transmitting the first plurality of updates prior to transmitting the second plurality of updates.

In a forty-sixth aspect, alone or in combination with one or more of the first through forty-fifth aspects, transmitting the first plurality of updates and the second plurality of updates according to the ordering comprises transmitting a first update of the first plurality of updates, transmitting, after transmitting the first update, a second update of the second plurality of updates, transmitting, after transmitting the second update, a third update of the first plurality of updates, and transmitting, after transmitting the third update, a fourth update of the second plurality of updates.

In a forty-seventh aspect, alone or in combination with one or more of the first through forty-sixth aspects, the at least one observed environmental vector comprises a plurality of observed environmental vectors, and wherein the observed environmental vector configuration indicates an ordering associated with transmitting a plurality of updates corresponding to the plurality of observed environmental vectors.

In a forty-eighth aspect, alone or in combination with one or more of the first through forty-seventh aspects, process 600 includes identifying a collision between a scheduled transmission of the plurality of updates corresponding to the plurality of observed environmental vectors and an additional transmission, and refraining from transmitting an end portion of a report comprising the plurality of updates corresponding to the plurality of observed environmental vectors based at least in part on identifying the collision.

In a forty-ninth aspect, alone or in combination with one or more of the first through forty-eighth aspects, process 600 includes receiving a resource allocation associated with a scheduled transmission of the plurality of updates corresponding to the plurality of observed environmental vectors and an additional transmission, determining that the resource allocation is insufficient to transmit a report comprising the plurality of updates corresponding to the plurality of observed environmental vectors, and refraining from transmitting an end portion of the report based at least in part on determining that the resource allocation is insufficient to transmit the report.

In a fiftieth aspect, alone or in combination with one or more of the first through forty-ninth aspects, process 600 includes receiving a latent vector configuration that indicates a dynamic reporting procedure for reporting updates corresponding to at least one latent vector, determining an update corresponding to the at least one latent vector using at least one autoencoder, and transmitting the update corresponding to the at least one latent vector based at least in part on the latent vector configuration.

In a fifty-first aspect, alone or in combination with one or more of the first through fiftieth aspects, the observed environmental vector configuration comprises an indication to transmit the update corresponding to the at least one observed environmental vector based at least in part on receiving a latent vector feedback request.

In a fifty-second aspect, alone or in combination with one or more of the first through fifty-first aspects, the latent vector feedback request is carried in at least one of a DCI transmission, a MAC CE, or a combination thereof.

In a fifty-third aspect, alone or in combination with one or more of the first through fifty-second aspects, the latent vector feedback request comprises a trigger that triggers transmission of an update corresponding to the at least one latent vector, and wherein the trigger further triggers transmission of the update corresponding to the at least one observed environmental vector.

In a fifty-fourth aspect, alone or in combination with one or more of the first through fifty-third aspects, process 600 includes transmitting a feedback resource request, wherein the feedback resource request comprises a request for a first set of resources for transmitting the update corresponding to the at least one latent vector, a second set of resources for transmitting the update corresponding to the at least one observed environmental vector, or a combination thereof.

In a fifty-fifth aspect, alone or in combination with one or more of the first through fifty-fourth aspects, process 600 includes determining an occurrence of an update reporting trigger event, and transmitting, based at last on determining the occurrence of the update reporting trigger event, at least one of the update corresponding to the at least one observed environmental vector or the update corresponding to the at least one latent vector.

In a fifty-sixth aspect, alone or in combination with one or more of the first through fifty-fifth aspects, determining the update corresponding to the at least one latent vector comprises determining a locally updated latent vector based at least in part on at least one previously reported observed environmental vector.

In a fifty-seventh aspect, alone or in combination with one or more of the first through fifty-sixth aspects, determining the update corresponding to the at least one latent vector comprises determining a locally updated latent vector based at least in part on a default observed environmental vector.

In a fifty-eighth aspect, alone or in combination with one or more of the first through fifty-seventh aspects, the default observed environmental vector comprises an initial observed environmental vector that was determined at an initialization phase.

In a fifty-ninth aspect, alone or in combination with one or more of the first through fifty-eighth aspects, the default observed environmental vector comprises an initial observed environmental vector that was determined at a setup phase.

In a sixtieth aspect, alone or in combination with one or more of the first through fifty-ninth aspects, process 600 includes determining the update by determining a locally updated observed environmental vector.

In a sixty-first aspect, alone or in combination with one or more of the first through sixtieth aspects, transmitting the update comprises quantizing the locally updated observed environmental vector to generate a quantized update, and transmitting the quantized update.

In a sixty-second aspect, alone or in combination with one or more of the first through sixty-first aspects, the locally updated observed environmental vector comprises a plurality of elements, and wherein quantizing the locally updated observed environmental vector comprises quantizing each of the plurality of elements.

In a sixty-third aspect, alone or in combination with one or more of the first through sixty-second aspects, process 600 includes determining an indication of a bit size corresponding to the quantized update, wherein the quantized update comprises a fixed bit number, and wherein the fixed bit number comprises the bit size.

In a sixty-fourth aspect, alone or in combination with one or more of the first through sixty-third aspects, the indication of the bit size is carried in at least one of the observed environmental vector configuration, an RRC message, a DCI transmission, a MAC CE, or a combination thereof.

In a sixty-fifth aspect, alone or in combination with one or more of the first through sixty-fourth aspects, process 600 includes determining an indication of a maximum bit size corresponding to the quantized update, wherein the quantized update comprises a variable bit number, and wherein the variable bit number comprises a bit size that is less than or equal to the maximum bit size.

In a sixty-sixth aspect, alone or in combination with one or more of the first through sixty-fifth aspects, process 600 includes transmitting a quantization capability indication that indicates a maximum bit size for quantization of customization feature vector updates, wherein the maximum bit size is based at least in part on the quantization capability indication.

In a sixty-seventh aspect, alone or in combination with one or more of the first through sixty-sixth aspects, process 600 includes receiving a resource allocation for transmitting the update, and wherein the maximum bit size is based at least in part on the resource allocation.

In a sixty-eighth aspect, alone or in combination with one or more of the first through sixty-seventh aspects, the indication of the maximum bit size is carried in at least one of the observed environmental vector configuration, an RRC message, a DCI transmission, a MAC CE, or a combination thereof.

In a sixty-ninth aspect, alone or in combination with one or more of the first through sixty-eighth aspects, the quantized update comprises a non-uniform quantization of one or more elements of the locally updated observed environmental vector.

In a seventieth aspect, alone or in combination with one or more of the first through sixty-ninth aspects, process 600 includes receiving an indication of a non-uniform quantization scheme, wherein the non-uniform quantization is based at least in part on the indication of the non-uniform quantization scheme, wherein the non-uniform quantization scheme is carried in at least one of the observed environmental vector configuration, an RRC message, a DCI transmission, a MAC CE, or a combination thereof.

In a seventy-first aspect, alone or in combination with one or more of the first through seventieth aspects, process 600 includes transmitting a non-uniform quantization capability indication, wherein the non-uniform quantization scheme is based at least in part on the non-uniform quantization capability indication.

In a seventy-second aspect, alone or in combination with one or more of the first through seventy-first aspects, process 600 includes transmitting a non-uniform quantization suggestion, wherein the non-uniform quantization scheme is based at least in part on the non-uniform quantization suggestion.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
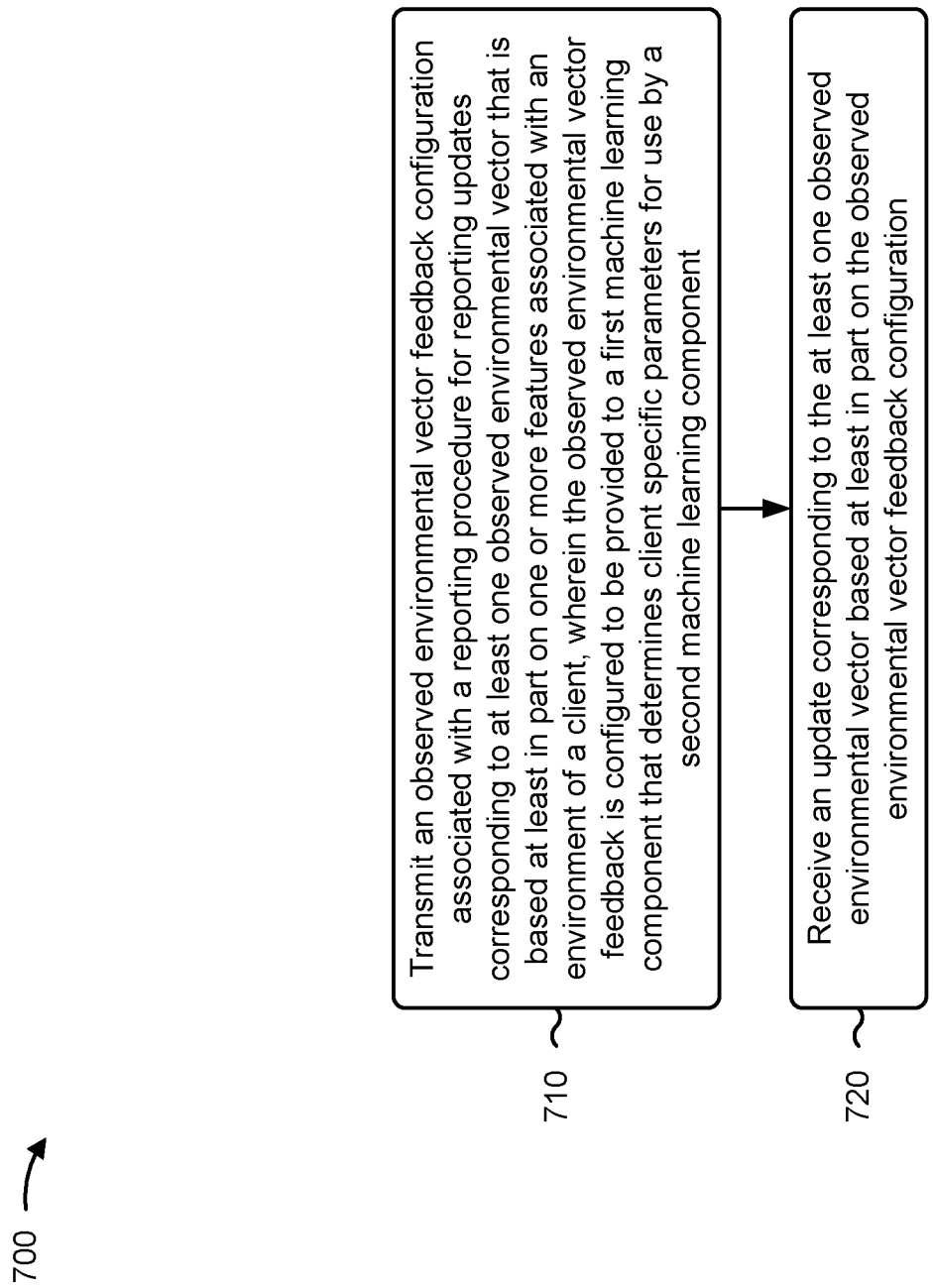

FIG. 7 is a diagram illustrating an example process 700 performed, for example, by a server, in accordance with the present disclosure. Example process 700 is an example where the server (e.g., server 510 shown in FIG. 5) performs operations associated with observed environmental vector feedback for wireless communication.

As shown in FIG. 7, in some aspects, process 700 may include transmitting an observed environmental vector feedback configuration associated with a reporting procedure for reporting updates corresponding to at least one observed environmental vector that is based at least in part on one or more features associated with an environment of a client, wherein the observed environmental vector comprises input for a first machine learning component that determines client specific parameters for use by a second machine learning component (block 710). For example, the server (e.g., using transmission component 1106, depicted in FIG. 11) may transmit an observed environmental vector feedback configuration associated with a reporting procedure for reporting updates corresponding to at least one observed environmental vector that is based at least in part on one or more features associated with an environment of a client, wherein the observed environmental vector comprises input for a first machine learning component that determines client specific parameters for use by a second machine learning component, as described above.

As further shown in FIG. 7, in some aspects, process 700 may include receiving an update corresponding to the at least one observed environmental vector based at least in part on the observed environmental vector feedback configuration (block 720). For example, the server (e.g., using reception component 1102, depicted in FIG. 11) may receive an update corresponding to the at least one observed environmental vector based at least in part on the observed environmental vector feedback configuration, as described above.

Process 700 may include additional aspects, such as any single aspect or any combination of aspects described below and/or in connection with one or more other processes described elsewhere herein.

In a first aspect, the first machine learning component comprises a first neural network.

In a second aspect, alone or in combination with the first aspect, the first neural network comprises a conditioning network.

In a third aspect, alone or in combination with one or more of the first and second aspects, the second machine learning component comprises a second neural network.

In a fourth aspect, alone or in combination with one or more of the first through third aspects, the second neural network comprises an autoencoder.

In a fifth aspect, alone or in combination with one or more of the first through fourth aspects, the at least one observed environmental vector comprises one or more elements, wherein the one or more elements indicate at least one of a client vendor ID, a client ID, a radio network temporary ID, a client antenna configuration, a client interference level, a panel ID, a reception beam ID, a large scale channel characteristic, a channel state information reference signal configuration, a serving cell ID, imaging data associated with an image obtained by an imaging device associated with the client, an element of an observed wireless communication vector, or a combination thereof.

In a sixth aspect, alone or in combination with one or more of the first through fifth aspects, the client ID comprises at least one of an international mobile equipment identity, an international mobile subscriber identity, or a combination thereof.

In a seventh aspect, alone or in combination with one or more of the first through sixth aspects, the large scale channel characteristic indicates at least one of a delay spread associated with a channel, a power delay profile associated with a channel, a Doppler measurement associated with a channel, a Doppler spectrum associated with a channel, a signal to noise ratio associated with a channel, a signal to noise plus interference ratio associated with a channel, a reference signal received power, a received signal strength indicator, or a combination thereof.

In an eighth aspect, alone or in combination with one or more of the first through seventh aspects, process 700 includes determining the update by determining a set of values corresponding to the at least one observed environmental vector.

In a ninth aspect, alone or in combination with one or more of the first through eighth aspects, the update comprises a locally updated observed environmental vector.

In a tenth aspect, alone or in combination with one or more of the first through ninth aspects, the update comprises a subset of elements of a locally updated observed environmental vector that are different than a corresponding subset of elements of a previously transmitted update.

In an eleventh aspect, alone or in combination with one or more of the first through tenth aspects, the at least one observed environmental vector comprises a plurality of observed environmental vectors.

In a twelfth aspect, alone or in combination with one or more of the first through eleventh aspects, the plurality of observed environmental vectors corresponds to a plurality of communication parameters.

In a thirteenth aspect, alone or in combination with one or more of the first through twelfth aspects, the plurality of communication parameters indicate at least one of a component carrier, a bandwidth part, a band, a band combination, a frequency range, a use case, a neural network identifier, or a combination thereof.

In a fourteenth aspect, alone or in combination with one or more of the first through thirteenth aspects, the use case comprises at least one of a channel state information derivation, a positioning measurement derivation, demodulation of a data channel, or a combination thereof.

In a fifteenth aspect, alone or in combination with one or more of the first through fourteenth aspects, a first observed environmental vector of the plurality of observed environmental vectors corresponds to a first communication parameter of the plurality of communication parameters, and wherein a second observed environmental vector of the plurality of observed environmental vectors corresponds to a second communication parameter of the plurality of communication parameters.

In a sixteenth aspect, alone or in combination with one or more of the first through fifteenth aspects, process 700 includes transmitting a capability report that indicates a number of observed environmental vectors that the client can support, wherein the observed environmental vector configuration is based at least in part on the capability report.

In a seventeenth aspect, alone or in combination with one or more of the first through sixteenth aspects, transmitting the update comprises transmitting the update using at least one of an uplink MAC CE, an RRC message, an uplink control information report, or a combination thereof.

In an eighteenth aspect, alone or in combination with one or more of the first through seventeenth aspects, the observed environmental vector configuration indicates at least one transmission parameter that indicates a quantity of scheduled uplink resources that can be used to carry one or more portions of the update.

In a nineteenth aspect, alone or in combination with one or more of the first through eighteenth aspects, the quantity of the scheduled uplink resources corresponds to a percentage of a set of allocated uplink resources.

In a twentieth aspect, alone or in combination with one or more of the first through nineteenth aspects, the set of allocated uplink resources correspond to at least one of a PUCCH, a PUSCH, or a combination thereof.

In a twenty-first aspect, alone or in combination with one or more of the first through twentieth aspects, the set of allocated uplink resources correspond to the PUCCH, and wherein the set of allocated uplink resources correspond to an uplink control information report.

In a twenty-second aspect, alone or in combination with one or more of the first through twenty-first aspects, the update comprises a conditioning network input indication that indicates one or more elements of the at least one observed environmental vector that are to be provided to a conditioning network as input for determining a conditioning vector.

In a twenty-third aspect, alone or in combination with one or more of the first through twenty-second aspects, the conditioning network input indication comprises one or more indices corresponding to the one or more elements.

In a twenty-fourth aspect, alone or in combination with one or more of the first through twenty-third aspects, the conditioning network input indication comprises a bitmap that indicates the one or more indices.

In a twenty-fifth aspect, alone or in combination with one or more of the first through twenty-fourth aspects, the update comprises a first part comprising the conditioning network input indication, and a second part comprising a set of values corresponding to the at least one observed environmental vector.

In a twenty-sixth aspect, alone or in combination with one or more of the first through twenty-fifth aspects, receiving the update comprises receiving the first part using a physical uplink control channel, and receiving the second part using a physical uplink shared channel.

In a twenty-seventh aspect, alone or in combination with one or more of the first through twenty-sixth aspects, receiving the update comprises receiving the first part using a UCI report, wherein the first part comprises a bitmap, and receiving the second part using the UCI report.

In a twenty-eighth aspect, alone or in combination with one or more of the first through twenty-seventh aspects, process 700 includes transmitting a latent vector configuration that indicates a periodic reporting procedure for reporting updates corresponding to at least one latent vector, and receiving an update corresponding to the at least one latent vector based at least in part on the latent vector configuration.

In a twenty-ninth aspect, alone or in combination with one or more of the first through twenty-eighth aspects, the latent vector configuration indicates a first periodicity associated with reporting updates corresponding to the at least one latent vector, wherein the first periodicity comprises an amount of time between consecutive transmissions of the updates corresponding to the at least one latent vector, and wherein the observed environmental vector configuration indicates a second periodicity associated with reporting the updates corresponding to the at least one observed environmental vector, wherein the second periodicity comprises an amount of time between consecutive transmissions of the updates corresponding to the at least one observed environmental vector.

In a thirtieth aspect, alone or in combination with one or more of the first through twenty-ninth aspects, the first periodicity is shorter than the second periodicity.

In a thirty-first aspect, alone or in combination with one or more of the first through thirtieth aspects, the latent vector configuration or the observed environmental vector configuration, or a combination thereof, is carried in at least one of an RRC message, a MAC CE, or a combination thereof.

In a thirty-second aspect, alone or in combination with one or more of the first through thirty-first aspects, the latent vector configuration indicates a first periodicity associated with reporting updates corresponding to the at least one latent vector, wherein the first periodicity comprises an amount of time between consecutive transmissions of the updates corresponding to the at least one latent vector, and wherein the observed environmental vector configuration indicates a scaling factor for determining a second periodicity relative to the first periodicity, wherein the second periodicity comprises an amount of time between consecutive transmissions of the updates corresponding to the at least one observed environmental vector.

In a thirty-third aspect, alone or in combination with one or more of the first through thirty-second aspects, the second periodicity is based at least in part on the first periodicity and the scaling factor.

In a thirty-fourth aspect, alone or in combination with one or more of the first through thirty-third aspects, process 700 includes receiving an indication of the second periodicity.

In a thirty-fifth aspect, alone or in combination with one or more of the first through thirty-fourth aspects, the scaling factor comprises an explicit scaling factor.

In a thirty-sixth aspect, alone or in combination with one or more of the first through thirty-fifth aspects, the observed environmental vector configuration comprises a scaling factor table that maps the first periodicity to one or more second periodicity options.

In a thirty-seventh aspect, alone or in combination with one or more of the first through thirty-sixth aspects, the second periodicity is selected from one or more second periodicity options.

In a thirty-eighth aspect, alone or in combination with one or more of the first through thirty-seventh aspects, the scaling factor comprises an implicit scaling factor, wherein the first periodicity maps to the second periodicity.

In a thirty-ninth aspect, alone or in combination with one or more of the first through thirty-eighth aspects, the at least one observed environmental vector comprises a plurality of observed environmental vectors and the at least one latent vector comprises a plurality of latent vectors, and wherein receiving the update comprises receiving, according to an ordering, a first plurality of updates that correspond to the plurality of observed environmental vectors, and receiving, according to the ordering, a second plurality of updates that correspond to the plurality of latent vectors.

In a fortieth aspect, alone or in combination with one or more of the first through thirty-ninth aspects, receiving the first plurality of updates and the second plurality of updates according to the ordering comprises receiving the first plurality of updates prior to receiving the second plurality of updates.

In a forty-first aspect, alone or in combination with one or more of the first through fortieth aspects, receiving the first plurality of updates and the second plurality of updates according to the ordering comprises receiving a first update of the first plurality of updates, receiving, after receiving the first update, a second update of the second plurality of updates, receiving, after receiving the second update, a third update of the first plurality of updates, and receiving, after receiving the third update, a fourth update of the second plurality of updates.

In a forty-second aspect, alone or in combination with one or more of the first through forty-first aspects, the at least one observed environmental vector comprises a plurality of elements, and wherein the observed environmental vector configuration indicates an ordering associated with transmitting a plurality of updates corresponding to the plurality of elements.

In a forty-third aspect, alone or in combination with one or more of the first through forty-second aspects, the at least one observed environmental vector comprises a plurality of elements and the at least one latent vector comprises a plurality of latent vectors, and wherein receiving the update comprises receiving, according to an ordering, a first plurality of updates that correspond to the plurality of elements, and receiving, according to the ordering, a second plurality of updates that correspond to the plurality of latent vectors.

In a forty-fourth aspect, alone or in combination with one or more of the first through forty-third aspects, receiving the first plurality of updates and the second plurality of updates according to the ordering comprises receiving the first plurality of updates prior to receiving the second plurality of updates.

In a forty-fifth aspect, alone or in combination with one or more of the first through forty-fourth aspects, receiving the first plurality of updates and the second plurality of updates according to the ordering comprises receiving a first update of the first plurality of updates, receiving, after receiving the first update, a second update of the second plurality of updates, receiving, after receiving the second update, a third update of the first plurality of updates, and receiving, after receiving the third update, a fourth update of the second plurality of updates.

In a forty-sixth aspect, alone or in combination with one or more of the first through forty-fifth aspects, the at least one observed environmental vector comprises a plurality of observed environmental vectors, and wherein the observed environmental vector configuration indicates an ordering associated with transmitting a plurality of updates corresponding to the plurality of observed environmental vectors.

In a forty-seventh aspect, alone or in combination with one or more of the first through forty-sixth aspects, process 700 includes transmitting a latent vector configuration that indicates a dynamic reporting procedure for reporting updates corresponding to at least one latent vector, and receiving an update corresponding to the at least one latent vector based at least in part on the latent vector configuration.

In a forty-eighth aspect, alone or in combination with one or more of the first through forty-seventh aspects, the observed environmental vector configuration comprises an indication to transmit the update corresponding to the at least one observed environmental vector based at least in part on receiving a latent vector feedback request.

In a forty-ninth aspect, alone or in combination with one or more of the first through forty-eighth aspects, the latent vector feedback request is carried in at least one of a DCI transmission, a MAC CE, or a combination thereof.

In a fiftieth aspect, alone or in combination with one or more of the first through forty-ninth aspects, the latent vector feedback request comprises a trigger that triggers transmission of an update corresponding to the at least one latent vector, and wherein the trigger further triggers transmission of the update corresponding to the at least one observed environmental vector.

In a fifty-first aspect, alone or in combination with one or more of the first through fiftieth aspects, process 700 includes receiving a feedback resource request, wherein the feedback resource request comprises a request for a first set of resources for transmitting the update corresponding to the at least one latent vector, a second set of resources for transmitting the update corresponding to the at least one observed environmental vector, or a combination thereof.

In a fifty-second aspect, alone or in combination with one or more of the first through fifty-first aspects, process 700 includes receiving, based at last on a determination of an occurrence of an update reporting trigger event, at least one of the update corresponding to the at least one observed environmental vector or the update corresponding to the at least one latent vector.

In a fifty-third aspect, alone or in combination with one or more of the first through fifty-second aspects, the update corresponding to the at least one latent vector comprises a locally updated latent vector based at least in part on at least one previously reported observed environmental vector.

In a fifty-fourth aspect, alone or in combination with one or more of the first through fifty-third aspects, the update corresponding to the at least one latent vector comprises a locally updated latent vector based at least in part on a default observed environmental vector.

In a fifty-fifth aspect, alone or in combination with one or more of the first through fifty-fourth aspects, the default observed environmental vector comprises an initial observed environmental vector that was determined at an initialization phase.

In a fifty-sixth aspect, alone or in combination with one or more of the first through fifty-fifth aspects, the default observed environmental vector comprises an initial observed environmental vector that was determined at a setup phase.

In a fifty-seventh aspect, alone or in combination with one or more of the first through fifty-sixth aspects, the update comprises a locally updated observed environmental vector.

In a fifty-eighth aspect, alone or in combination with one or more of the first through fifty-seventh aspects, receiving the update comprises receiving a quantized update that comprises a quantized locally updated observed environmental vector.

In a fifty-ninth aspect, alone or in combination with one or more of the first through fifty-eighth aspects, the locally updated observed environmental vector comprises a plurality of elements, and wherein each of the plurality of elements is quantized.

In a sixtieth aspect, alone or in combination with one or more of the first through fifty-ninth aspects, process 700 includes transmitting an indication of a bit size corresponding to the quantized update, wherein the quantized update comprises a fixed bit number, and wherein the fixed bit number comprises the bit size.

In a sixty-first aspect, alone or in combination with one or more of the first through sixtieth aspects, the indication of the bit size is carried in at least one of the observed environmental vector configuration, an RRC message, a DCI transmission, a MAC CE, or a combination thereof.

In a sixty-second aspect, alone or in combination with one or more of the first through sixty-first aspects, process 700 includes transmitting an indication of a maximum bit size corresponding to the quantized update, wherein the quantized update comprises a variable bit number, and wherein the variable bit number comprises a bit size that is less than or equal to the maximum bit size.

In a sixty-third aspect, alone or in combination with one or more of the first through sixty-second aspects, process 700 includes receiving a quantization capability indication that indicates a maximum bit size for quantization of customization feature vector updates, wherein the maximum bit size is based at least in part on the quantization capability indication.

In a sixty-fourth aspect, alone or in combination with one or more of the first through sixty-third aspects, process 700 includes transmitting a resource allocation for transmitting the update, and wherein the maximum bit size is based at least in part on the resource allocation.

In a sixty-fifth aspect, alone or in combination with one or more of the first through sixty-fourth aspects, the indication of the maximum bit size is carried in at least one of the observed environmental vector configuration, an RRC message, a DCI transmission, a MAC CE, or a combination thereof.

In a sixty-sixth aspect, alone or in combination with one or more of the first through sixty-fifth aspects, the quantized update comprises a non-uniform quantization of one or more elements of the locally updated observed environmental vector.

In a sixty-seventh aspect, alone or in combination with one or more of the first through sixty-sixth aspects, process 700 includes transmitting an indication of a non-uniform quantization scheme, wherein the non-uniform quantization is based at least in part on the indication of the non-uniform quantization scheme, wherein the non-uniform quantization scheme is carried in at least one of the observed environmental vector configuration, an RRC message, a DCI transmission, a MAC CE, or a combination thereof.

In a sixty-eighth aspect, alone or in combination with one or more of the first through sixty-seventh aspects, process 700 includes receiving a non-uniform quantization capability indication, wherein the non-uniform quantization scheme is based at least in part on the non-uniform quantization capability indication.

In a sixty-ninth aspect, alone or in combination with one or more of the first through sixty-eighth aspects, process 700 includes receiving a non-uniform quantization suggestion, wherein the non-uniform quantization scheme is based at least in part on the non-uniform quantization suggestion.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
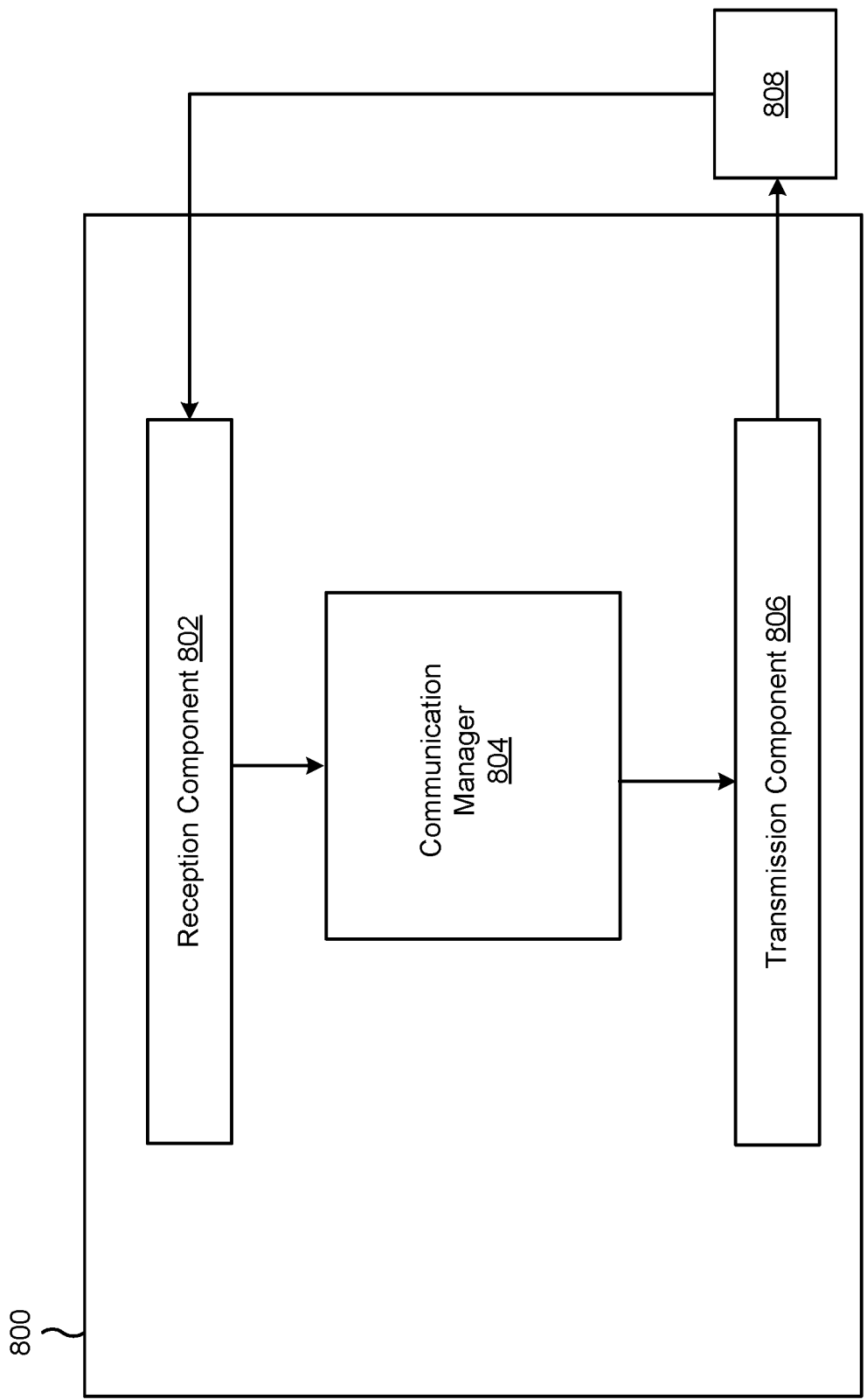
FIGS. 8-13 are examples of apparatuses for implementing clients and/or servers, in accordance with the present disclosure.

FIG. 8 is a block diagram of an example apparatus 800 for wireless communication in accordance with the present disclosure. The apparatus 800 may be, be similar to, include, or be included in a client (e.g., client 505 shown in FIG. 5 and/or client 402 shown in FIG. 4). In some aspects, the apparatus 800 includes a reception component 802, a communication manager 804, and a transmission component 806, which may be in communication with one another (for example, via one or more buses). As shown, the apparatus 800 may communicate with another apparatus 808 (such as a client, a server, a UE, a base station, or another wireless communication device) using the reception component 802 and the transmission component 806.

In some aspects, the apparatus 800 may be configured to perform one or more operations described herein in connection with FIGS. 3-5. Additionally or alternatively, the apparatus 800 may be configured to perform one or more processes described herein, such as process 800 of FIG. 8, process 600 of FIG. 6. In some aspects, the apparatus 800 may include one or more components of the first UE described above in connection with FIG. 2.

The reception component 802 may provide means for receiving communications, such as reference signals, control information, data communications, or a combination thereof, from the apparatus 808. The reception component 802 may provide received communications to one or more other components of the apparatus 800, such as the communication manager 804. In some aspects, the reception component 802 may provide means for signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 802 may include one or more antennas, a demodulator, a MIMO detector, a receive processor, a controller/processor, a memory, or a combination thereof, of the first UE described above in connection with FIG. 2.

The transmission component 806 may provide means for transmitting communications, such as reference signals, control information, data communications, or a combination thereof, to the apparatus 808. In some aspects, the communication manager 804 may generate communications and may transmit the generated communications to the transmission component 806 for transmission to the apparatus 808. In some aspects, the transmission component 806 may provide means for performing signal processing on the generated communications (such as filtering, amplification, modulation, digital-to-analog conversion, multiplexing, interleaving, mapping, or encoding, among other examples), and may transmit the processed signals to the apparatus 808. In some aspects, the transmission component 806 may include one or more antennas, a modulator, a transmit MIMO processor, a transmit processor, a controller/processor, a memory, or a combination thereof, of the first UE described above in connection with FIG. 2. In some aspects, the transmission component 806 may be co-located with the reception component 802 in a transceiver.

In some aspects, the communication manager 804 may provide means for receiving an observed environmental vector feedback configuration associated with a reporting procedure for reporting updates corresponding to at least one observed environmental vector that is based at least in part on one or more features associated with an environment of the client device, wherein the observed environmental vector comprises input for a first machine learning component that determines client specific parameters for use by a second machine learning component; and means for transmitting an update corresponding to the at least one observed environmental vector based at least in part on the observed environmental vector feedback configuration. In some aspects, the communication manager 804 may include a controller/processor, a memory, or a combination thereof, of the first UE described above in connection with FIG. 2. In some aspects, the communication manager 804 may include the reception component 802, the transmission component 806, and/or the like. In some aspects, the means provided by the communication manager 804 may include, or be included within means provided by the reception component 802, the transmission component 806, and/or the like.

In some aspects, the communication manager 804 and/or one or more components of the communication manager 804 may include or may be implemented within hardware (e.g., one or more of the circuitry described in connection with FIG. 2). In some aspects, the communication manager 804 and/or one or more components thereof may include or may be implemented within a controller/processor, a memory, or a combination thereof, of the UE 120 described above in connection with FIG. 2.

In some aspects, the communication manager 804 and/or one or more components of the communication manager 804 may be implemented in code (e.g., as software or firmware stored in a memory), such as the code described in connection with FIG. 10. For example, the communication manager 804 and/or a component (or a portion of a component) of the communication manager 804 may be implemented as instructions or code stored in a non-transitory computer-readable medium and executable by a controller or a processor to perform the functions or operations of the communication manager 804 and/or the component. If implemented in code, the functions of the communication manager 804 and/or a component may be executed by a controller/processor, a memory, a scheduler, a communication unit, or a combination thereof, of the UE 120 described above in connection with FIG. 2.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally or alternatively, a set of (one or more) components shown in FIG. 8 may perform one or more functions described as being performed by another set of components shown in FIG. 8.

Figure 9:
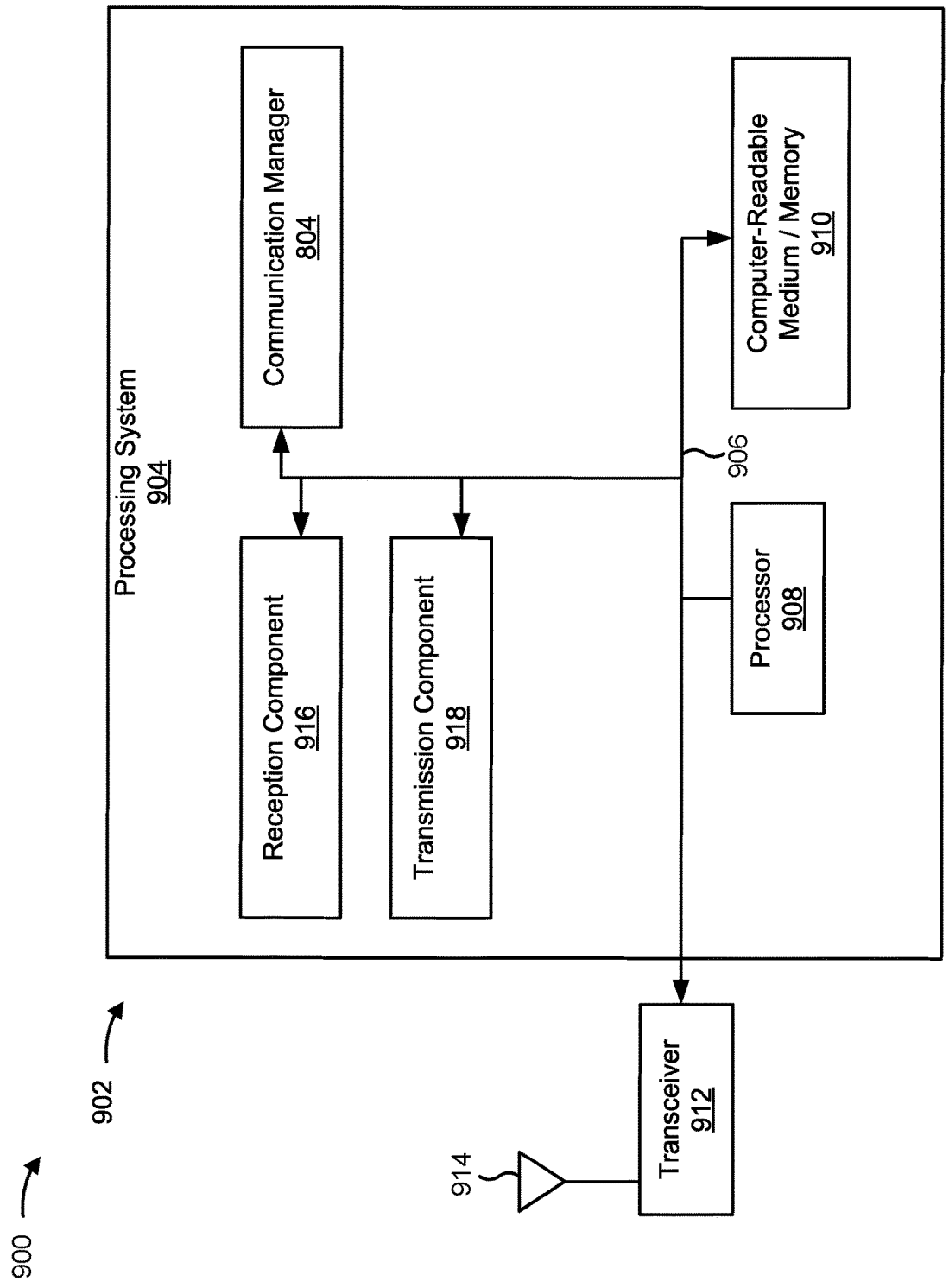

FIG. 9 is a diagram illustrating an example 900 of a hardware implementation for an apparatus 902 employing a processing system 904. The apparatus 902 may be, be similar to, include, or be included in the apparatus 800 shown in FIG. 8.

The processing system 904 may be implemented with a bus architecture, represented by the bus 906. The bus 906 may include any number of interconnecting buses and bridges depending on the specific application of the processing system 904 and the overall design constraints. The bus 906 links together various circuits including one or more processors and/or hardware components, represented by a processor 908, the illustrated components, and the computer-readable medium/memory 910. The bus 906 may also link various other circuits, such as timing sources, peripherals, voltage regulators, power management circuits, and/or the like.

The processing system 904 may be coupled to a transceiver 912. The transceiver 912 is coupled to one or more antennas 914. The transceiver 912 provides a means for communicating with various other apparatuses over a transmission medium. The transceiver 912 receives a signal from the one or more antennas 914, extracts information from the received signal, and provides the extracted information to the processing system 904, specifically a reception component 916. In addition, the transceiver 912 receives information from the processing system 904, specifically a transmission component 918, and generates a signal to be applied to the one or more antennas 914 based at least in part on the received information.

The processor 908 is coupled to the computer-readable medium/memory 910. The processor 908 is responsible for processing, including the execution of software stored on the computer-readable medium/memory 910. The software, when executed by the processor 908, causes the processing system 904 to perform the various functions described herein in connection with a client. The computer-readable medium/memory 910 may also be used for storing data that is manipulated by the processor 908 when executing software. The processing system 904 may include any number of additional components not illustrated in FIG. 9. The components illustrated and/or not illustrated may be software modules running in the processor 908, resident/stored in the computer readable medium/memory 910, one or more hardware modules coupled to the processor 908, or some combination thereof.

In some aspects, the processing system 904 may be a component of the UE 120 and may include the memory 282 and/or at least one of the TX MIMO processor 266, the RX processor 258, and/or the controller/processor 280. In some aspects, the apparatus 902 for wireless communication provides means for receiving an observed environmental vector feedback configuration associated with a reporting procedure for reporting updates corresponding to at least one observed environmental vector that is based at least in part on one or more features associated with an environment of the client device, wherein the observed environmental vector comprises input for a first machine learning component that determines client specific parameters for use by a second machine learning component; and means for transmitting an update corresponding to the at least one observed environmental vector based at least in part on the observed environmental vector feedback configuration. The aforementioned means may be one or more of the aforementioned components of the processing system 904 of the apparatus 902 configured to perform the functions recited by the aforementioned means. As described elsewhere herein, the processing system 904 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein.

FIG. 9 is provided as an example. Other examples may differ from what is described in connection with FIG. 9.

Figure 10:
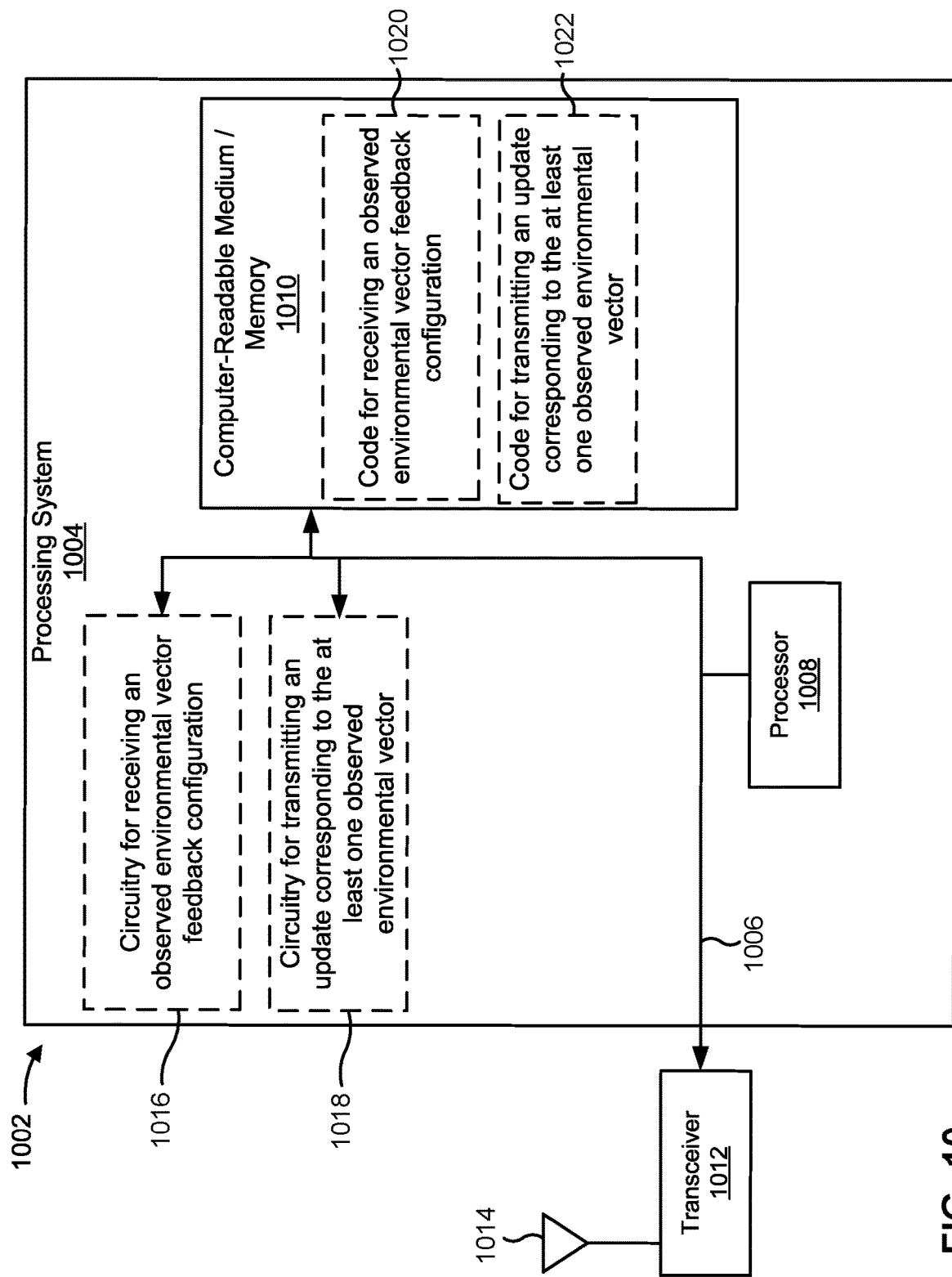

FIG. 10 is a diagram illustrating an example 1000 of an implementation of code and circuitry for an apparatus 1002 for wireless communication. The apparatus 1002 may be, be similar to, include, or be included in the apparatus 902 shown in FIG. 9 and/or the apparatus 800 shown in FIG. 8. The apparatus 1002 may include a processing system 1004, which may include a bus 1006 coupling one or more components such as, for example, a processor 1008, computer-readable medium/memory 1010, a transceiver 1012, and/or the like. As shown, the transceiver 1012 may be coupled to one or more antenna 1014.

As further shown in FIG. 10, the apparatus 1002 may include circuitry for receiving an observed environmental vector feedback configuration associated with a reporting procedure for reporting updates corresponding to at least one observed environmental vector that is based at least in part on one or more features associated with an environment of the client device, wherein the observed environmental vector comprises input for a first machine learning component that determines client specific parameters for use by a second machine learning component (circuitry 1016). For example, the apparatus 1002 may include circuitry 1016 to enable the apparatus 1002 to receive an observed environmental vector feedback configuration associated with a reporting procedure for reporting updates corresponding to at least one observed environmental vector that is based at least in part on one or more features associated with an environment of the client device, wherein the observed environmental vector comprises input for a first machine learning component that determines client specific parameters for use by a second machine learning component.

As further shown in FIG. 10, the apparatus 1002 may include circuitry for transmitting an update corresponding to the at least one observed environmental vector based at least in part on the observed environmental vector feedback configuration (circuitry 1018). For example, the apparatus 1002 may include circuitry 1018 to enable the apparatus 1002 to transmit an update corresponding to the at least one observed environmental vector based at least in part on the observed environmental vector feedback configuration.

As further shown in FIG. 10, the apparatus 1002 may include, stored in computer-readable medium 1010, code for receiving an observed environmental vector feedback configuration associated with a reporting procedure for reporting updates corresponding to at least one observed environmental vector that is based at least in part on one or more features associated with an environment of the client device, wherein the observed environmental vector comprises input for a first machine learning component that determines client specific parameters for use by a second machine learning component (code 1020). For example, the apparatus 1002 may include code 1020 that, when executed by the processor 1008, may cause the transceiver 1012 to receive an observed environmental vector feedback configuration associated with a reporting procedure for reporting updates corresponding to at least one observed environmental vector that is based at least in part on one or more features associated with an environment of the client device, wherein the observed environmental vector comprises input for a first machine learning component that determines client specific parameters for use by a second machine learning component.

As further shown in FIG. 10, the apparatus 1002 may include, stored in computer-readable medium 1010, code for transmitting an update corresponding to the at least one observed environmental vector based at least in part on the observed environmental vector feedback configuration (code 1022). For example, the apparatus 1002 may include code 1022 that, when executed by the processor 1008, may cause the transceiver 1012 to transmit an update corresponding to the at least one observed environmental vector based at least in part on the observed environmental vector feedback configuration.

FIG. 10 is provided as an example. Other examples may differ from what is described in connection with FIG. 10.

Figure 11:
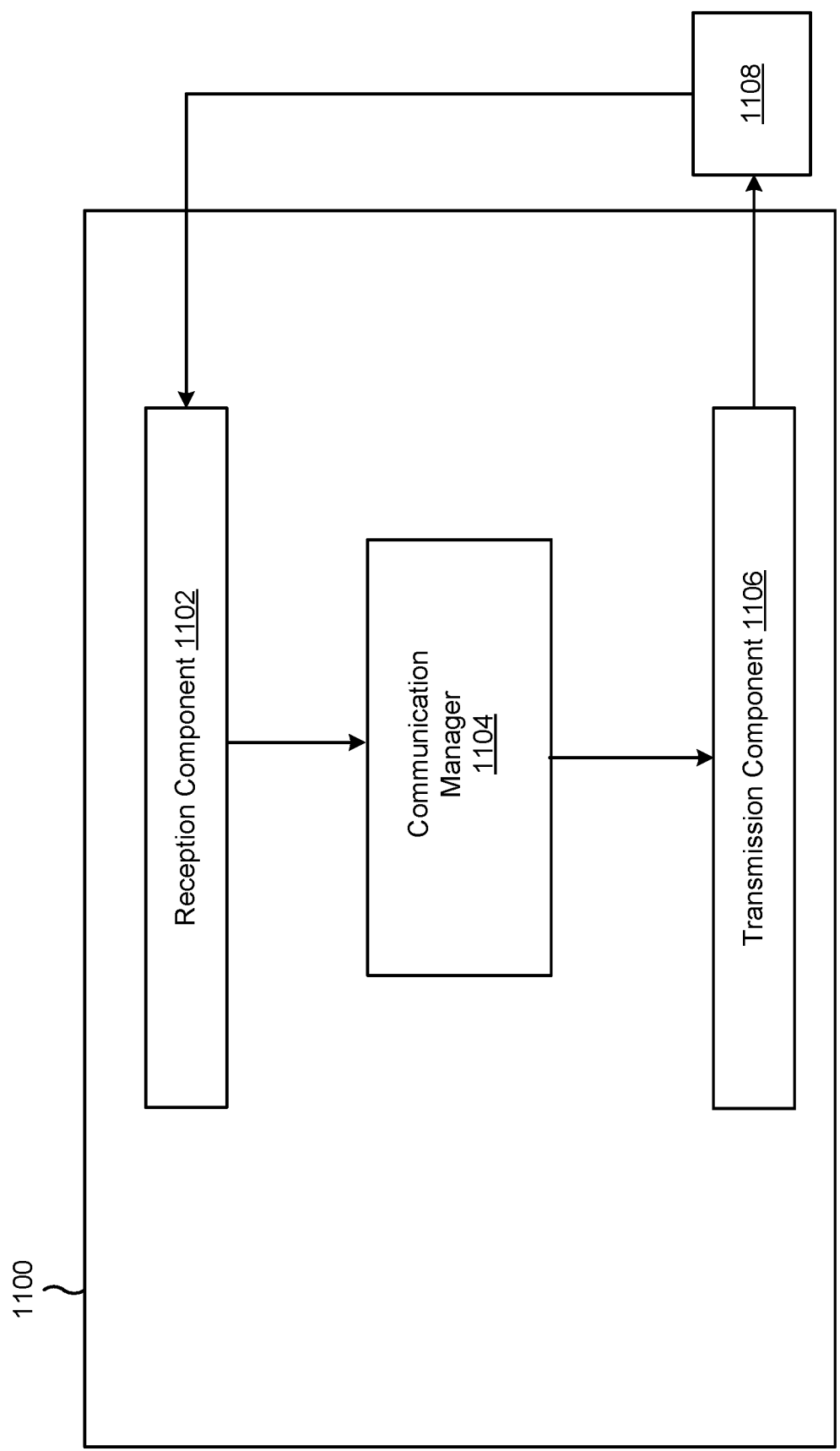

FIG. 11 is a block diagram of an example apparatus 1100 for wireless communication in accordance with the present disclosure. The apparatus 1100 may be, be similar to, include, or be included in a server (e.g., server 510 shown in FIG. 5 and/or server 404 shown in FIG. 4). In some aspects, the apparatus 1100 includes a reception component 1102, a communication manager 1104, and a transmission component 1106, which may be in communication with one another (for example, via one or more buses). As shown, the apparatus 1100 may communicate with another apparatus 1108 (such as a client, a server, a UE, a base station, or another wireless communication device) using the reception component 1102 and the transmission component 1106.

In some aspects, the apparatus 1100 may be configured to perform one or more operations described herein in connection with FIGS. 3-5. Additionally or alternatively, the apparatus 1100 may be configured to perform one or more processes described herein, such as process 700 of FIG. 7. In some aspects, the apparatus 1100 may include one or more components of the base station described above in connection with FIG. 2.

The reception component 1102 may provide means for receiving communications, such as reference signals, control information, data communications, or a combination thereof, from the apparatus 1108. The reception component 1102 may provide received communications to one or more other components of the apparatus 1100, such as the communication manager 1104. In some aspects, the reception component 1102 may provide means for performing signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1102 may include one or more antennas, a demodulator, a MIMO detector, a receive processor, a controller/processor, a memory, or a combination thereof, of the base station described above in connection with FIG. 2.

The transmission component 1106 may provide means for transmitting communications, such as reference signals, control information, data communications, or a combination thereof, to the apparatus 1108. In some aspects, the communication manager 1104 may generate communications and may transmit the generated communications to the transmission component 1106 for transmission to the apparatus 1108. In some aspects, the transmission component 1106 may provide means for performing signal processing on the generated communications (such as filtering, amplification, modulation, digital-to-analog conversion, multiplexing, interleaving, mapping, or encoding, among other examples), and may transmit the processed signals to the apparatus 1108. In some aspects, the transmission component 1106 may include one or more antennas, a modulator, a transmit MIMO processor, a transmit processor, a controller/processor, a memory, or a combination thereof, of the base station described above in connection with FIG. 2. In some aspects, the transmission component 1106 may be co-located with the reception component 1102 in a transceiver.

The communication manager 1104 may provide means for transmitting an observed environmental vector feedback configuration associated with a reporting procedure for reporting updates corresponding to at least one observed environmental vector that is based at least in part on one or more features associated with an environment of a client device, wherein the observed environmental vector comprises input for a first machine learning component that determines client specific parameters for use by a second machine learning component; and means for receiving an update corresponding to the at least one observed environmental vector based at least in part on the observed environmental vector feedback configuration. In some aspects, the communication manager 1104 may include a controller/processor, a memory, a scheduler, a communication unit, or a combination thereof, of the base station described above in connection with FIG. 2. In some aspects, the communication manager 1104 may include the reception component 1102, the transmission component 1106, and/or the like. In some aspects, the means provided by the communication manager 1104 may include, or be included within means provided by the reception component 1102, the transmission component 1106, and/or the like.

In some aspects, the communication manager 1104 and/or one or more components thereof may include or may be implemented within hardware (e.g., one or more of the circuitry described in connection with FIG. 13). In some aspects, the communication manager 1104 and/or one or more components thereof may include or may be implemented within a controller/processor, a memory, or a combination thereof, of the BS 110 described above in connection with FIG. 2.

In some aspects, the communication manager 1104 and/or one or more components thereof may be implemented in code (e.g., as software or firmware stored in a memory), such as the code described in connection with FIG. 13. For example, the communication manager 1104 and/or a component (or a portion of a component) of the communication manager 1104 may be implemented as instructions or code stored in a non-transitory computer-readable medium and executable by a controller or a processor to perform the functions or operations of the communication manager 1104 and/or the component. If implemented in code, the functions of the communication manager 1104 and/or a component may be executed by a controller/processor, a memory, a scheduler, a communication unit, or a combination thereof, of the BS 110 described above in connection with FIG. 2.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally or alternatively, a set of (one or more) components shown in FIG. 11 may perform one or more functions described as being performed by another set of components shown in FIG. 11.

Figure 12:
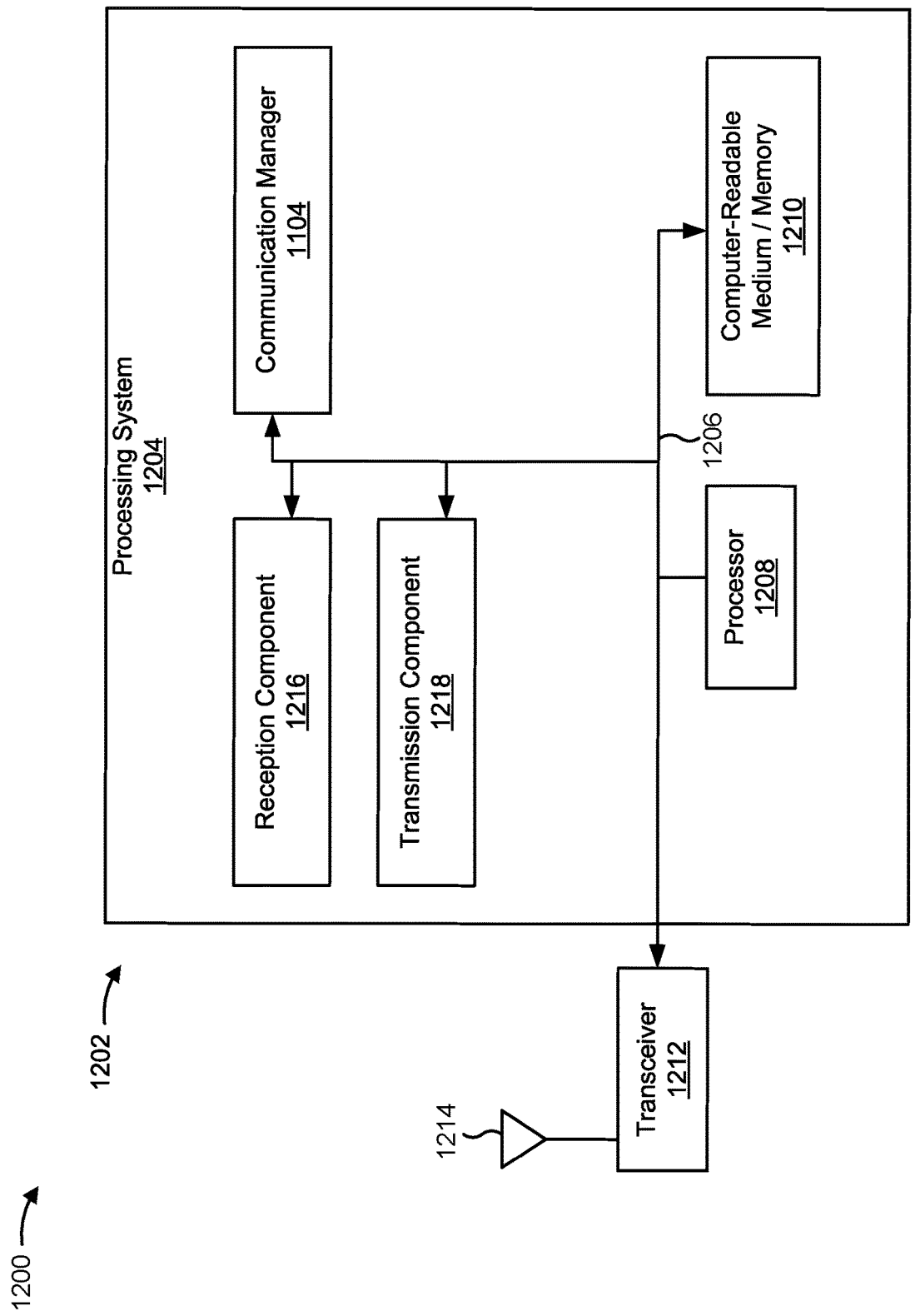

FIG. 12 is a diagram illustrating an example 1200 of a hardware implementation for an apparatus 1202 employing a processing system 1204. The apparatus 1202 may be, be similar to, include, or be included in the apparatus 1100 shown in FIG. 11.

The processing system 1204 may be implemented with a bus architecture, represented by the bus 1206. The bus 1206 may include any number of interconnecting buses and bridges depending on the specific application of the processing system 1204 and the overall design constraints. The bus 1206 links together various circuits including one or more processors and/or hardware components, represented by a processor 1208, the illustrated components, and the computer-readable medium/memory 1210. The bus 1206 may also link various other circuits, such as timing sources, peripherals, voltage regulators, power management circuits, and/or the like.

The processing system 1204 may be coupled to a transceiver 1212. The transceiver 1212 is coupled to one or more antennas 1214. The transceiver 1212 provides a means for communicating with various other apparatuses over a transmission medium. The transceiver 1212 receives a signal from the one or more antennas 1214, extracts information from the received signal, and provides the extracted information to the processing system 1204, specifically a reception component 1216. In addition, the transceiver 1212 receives information from the processing system 1204, specifically a transmission component 1218, and generates a signal to be applied to the one or more antennas 1214 based at least in part on the received information.

The processor 1208 is coupled to the computer-readable medium/memory 1210. The processor 1208 is responsible for processing, including the execution of software stored on the computer-readable medium/memory 1210. The software, when executed by the processor 1208, causes the processing system 1204 to perform the various functions described herein in connection with a server. The computer-readable medium/memory 1210 may also be used for storing data that is manipulated by the processor 1208 when executing software. The processing system 1204 may include any number of additional components not illustrated in FIG. 12. The components illustrated and/or not illustrated may be software modules running in the processor 1208, resident/stored in the computer readable medium/memory 1210, one or more hardware modules coupled to the processor 1208, or some combination thereof.

In some aspects, the processing system 1204 may be a component of the UE 120 and may include the memory 282 and/or at least one of the TX MIMO processor 266, the RX processor 258, and/or the controller/processor 280. In some aspects, the apparatus 1202 for wireless communication provides means for transmitting an observed environmental vector feedback configuration associated with a reporting procedure for reporting updates corresponding to at least one observed environmental vector that is based at least in part on one or more features associated with an environment of a client device, wherein the observed environmental vector comprises input for a first machine learning component that determines client specific parameters for use by a second machine learning component; and means for receiving an update corresponding to the at least one observed environmental vector based at least in part on the observed environmental vector feedback configuration. The aforementioned means may be one or more of the aforementioned components of the processing system 1204 of the apparatus 1202 configured to perform the functions recited by the aforementioned means. As described elsewhere herein, the processing system 1204 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein.

FIG. 12 is provided as an example. Other examples may differ from what is described in connection with FIG. 12.

Figure 13:
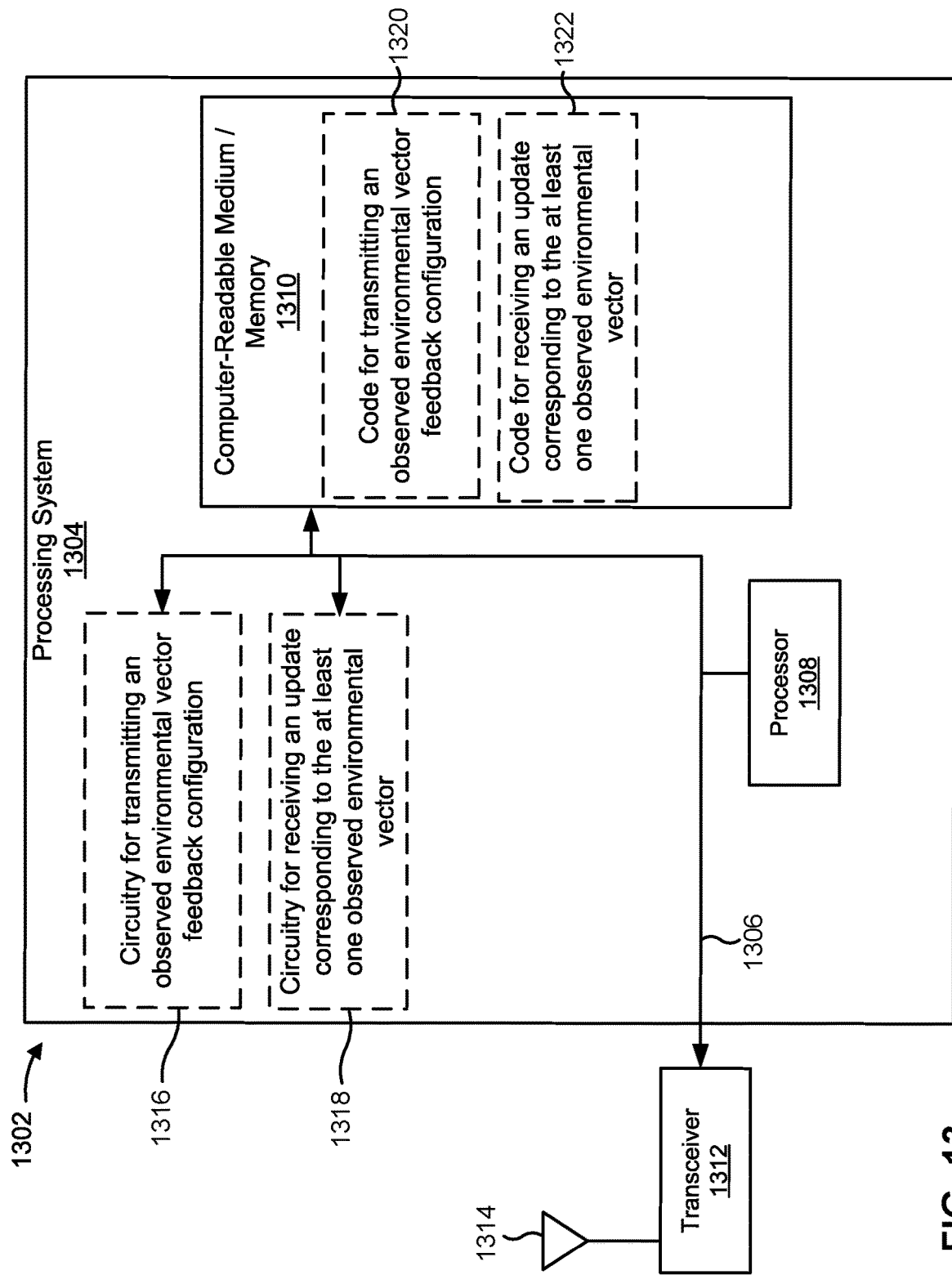

FIG. 13 is a diagram illustrating an example 1300 of an implementation of code and circuitry for an apparatus 1302 for wireless communication. The apparatus 1302 may be, be similar to, include, or be included in the apparatus 1202 shown in FIG. 12, and/or the apparatus 1100 shown in FIG. 11. The apparatus 1302 may include a processing system 1304, which may include a bus 1306 coupling one or more components such as, for example, a processor 1308, computer-readable medium/memory 1310, a transceiver 1312, and/or the like. As shown, the transceiver 1312 may be coupled to one or more antenna 1314.

As further shown in FIG. 13, the apparatus 1302 may include circuitry for transmitting an observed environmental vector feedback configuration associated with a reporting procedure for reporting updates corresponding to at least one observed environmental vector that is based at least in part on one or more features associated with an environment of a client device, wherein the observed environmental vector comprises input for a first machine learning component that determines client specific parameters for use by a second machine learning component (circuitry 1316). For example, the apparatus 1302 may include circuitry 1316 to enable the apparatus 1302 to transmit an observed environmental vector feedback configuration associated with a reporting procedure for reporting updates corresponding to at least one observed environmental vector that is based at least in part on one or more features associated with an environment of a client device, wherein the observed environmental vector comprises input for a first machine learning component that determines client specific parameters for use by a second machine learning component.

As further shown in FIG. 13, the apparatus 1302 may include circuitry for receiving an update corresponding to the at least one observed environmental vector based at least in part on the observed environmental vector feedback configuration (circuitry 1318). For example, the apparatus 1302 may include circuitry 1318 to enable the apparatus 1302 to receive an update corresponding to the at least one observed environmental vector based at least in part on the observed environmental vector feedback configuration.

As further shown in FIG. 13, the apparatus 1302 may include, stored in computer-readable medium 1310, code for transmitting an observed environmental vector feedback configuration associated with a reporting procedure for reporting updates corresponding to at least one observed environmental vector that is based at least in part on one or more features associated with an environment of a client device, wherein the observed environmental vector comprises input for a first machine learning component that determines client specific parameters for use by a second machine learning component (code 1320). For example, the apparatus 1302 may include code 1320 that, when executed by the processor 1308, may cause the transceiver 1312 to transmit an observed environmental vector feedback configuration associated with a reporting procedure for reporting updates corresponding to at least one observed environmental vector that is based at least in part on one or more features associated with an environment of a client device, wherein the observed environmental vector comprises input for a first machine learning component that determines client specific parameters for use by a second machine learning component.

As further shown in FIG. 13, the apparatus 1302 may include, stored in computer-readable medium 1310, code for receiving an update corresponding to the at least one observed environmental vector based at least in part on the observed environmental vector feedback configuration (code 1322). For example, the apparatus 1302 may include code 1322 that, when executed by the processor 1308, may cause the transceiver 1312 to receive an update corresponding to the at least one observed environmental vector based at least in part on the observed environmental vector feedback configuration.

FIG. 13 is provided as an example. Other examples may differ from what is described in connection with FIG. 13.

The following provides an overview of some Aspects of the present disclosure:

Aspect 1: A method of wireless communication performed by a client, comprising: receiving an observed environmental vector feedback configuration associated with a reporting procedure for reporting updates corresponding to at least one observed environmental vector that is based at least in part on one or more features associated with an environment of the client, wherein the observed environmental vector comprises input for a first machine learning component that determines client specific parameters for use by a second machine learning component; and transmitting an update corresponding to the at least one observed environmental vector based at least in part on the observed environmental vector feedback configuration.

Aspect 2: The method of Aspect 1, wherein the first machine learning component comprises a first neural network.

Aspect 3: The method of Aspect 2, wherein the first neural network comprises a conditioning network.

Aspect 4: The method of any of Aspects 1-3, wherein the second machine learning component comprises a second neural network.

Aspect 5: The method of Aspect 4, wherein the second neural network comprises an autoencoder.

Aspect 6: The method of any of Aspects 1-5, wherein the at least one observed environmental vector comprises one or more elements, wherein the one or more elements indicate at least one of: a client vendor identifier (ID), a client ID, a radio network temporary ID, a client antenna configuration, a client interference level, a panel ID, a reception beam ID, a large scale channel characteristic, a channel state information reference signal configuration, a serving cell ID, image data associated with an image obtained by an imaging device associated with the client, an element of an observed wireless communication vector, or a combination thereof.

Aspect 7: The method of Aspect 6, wherein the client ID comprises at least one of: an international mobile equipment identity, an international mobile subscriber identity, or a combination thereof.

Aspect 8: The method of either of Aspects 6 or 7, wherein the large scale channel characteristic indicates at least one of: a delay spread associated with a channel, a power delay profile associated with a channel, a Doppler measurement associated with a channel, a Doppler spectrum associated with a channel, a signal to noise ratio associated with a channel, a signal to noise plus interference ratio associated with a channel, a reference signal received power, a received signal strength indicator, or a combination thereof.

Aspect 9: The method of any of Aspects 1-8, further comprising determining the update by determining a set of values corresponding to the at least one observed environmental vector.

Aspect 10: The method of any of Aspects 1-9, wherein the update comprises a locally updated observed environmental vector.

Aspect 11: The method of any of Aspects 1-10, wherein the update comprises a subset of elements of a locally updated observed environmental vector that are different than a corresponding subset of elements of a previously transmitted update.

Aspect 12: The method of any of Aspects 1-11, wherein the at least one observed environmental vector comprises a plurality of observed environmental vectors.

Aspect 13: The method of Aspect 12, wherein the plurality of observed environmental vectors corresponds to a plurality of communication parameters.

Aspect 14: The method of Aspect 13, wherein the plurality of communication parameters indicate at least one of: a component carrier, a bandwidth part, a band, a band combination, a frequency range, a use case, a neural network identifier, or a combination thereof.

Aspect 15: The method of Aspect 14, wherein the use case comprises at least one of: a channel state information derivation, a positioning measurement derivation, demodulation of a data channel, or a combination thereof.

Aspect 16: The method of any of Aspects 13-15, wherein a first observed environmental vector of the plurality of observed environmental vectors corresponds to a first communication parameter of the plurality of communication parameters, and wherein a second observed environmental vector of the plurality of observed environmental vectors corresponds to a second communication parameter of the plurality of communication parameters.

Aspect 17: The method of any of Aspects 1-16, further comprising: transmitting a capability report that indicates a number of observed environmental vectors that the client can support; wherein the observed environmental vector configuration is based at least in part on the capability report.

Aspect 18: The method of any of Aspects 1-17, wherein transmitting the update comprises transmitting the update using at least one of: an uplink medium access control (MAC) control element, a radio resource control message, an uplink control information report, or a combination thereof.

Aspect 19: The method of any of Aspects 1-18, wherein the observed environmental vector configuration indicates at least one transmission parameter that indicates a quantity of scheduled uplink resources that can be used to carry one or more portions of the update.

Aspect 20: The method of Aspect 19, wherein the quantity of the scheduled uplink resources corresponds to a percentage of a set of allocated uplink resources.

Aspect 21: The method of Aspect 20, wherein the set of allocated uplink resources correspond to at least one of: a physical uplink control channel (PUCCH), a physical uplink shared channel (PUSCH), or a combination thereof.

Aspect 22: The method of Aspect 21, wherein the set of allocated uplink resources correspond to the PUCCH, and wherein the set of allocated uplink resources correspond to an uplink control information report.

Aspect 23: The method of any of Aspects 1-22, wherein the update comprises a conditioning network input indication that indicates one or more elements of the at least one observed environmental vector that are to be provided to a conditioning network as input for determining a conditioning vector.

Aspect 24: The method of Aspect 23, wherein the conditioning network input indication comprises one or more indices corresponding to the one or more elements.

Aspect 25: The method of Aspect 24, wherein the conditioning network input indication comprises a bitmap that indicates the one or more indices.

Aspect 26: The method of any of Aspects 23-25, wherein the update comprises: a first part comprising the conditioning network input indication; and a second part comprising a set of values corresponding to the at least one observed environmental vector.

Aspect 27: The method of Aspect 26, wherein transmitting the update comprises: transmitting the first part using a physical uplink control channel; and transmitting the second part using a physical uplink shared channel.

Aspect 28: The method of either of Aspects 26 or 27, wherein transmitting the update comprises: transmitting the first part using an uplink control information (UCI) report, wherein the first part comprises a bitmap; and transmitting the second part using the UCI report.

Aspect 29: The method of any of Aspects 1-28, further comprising: receiving a latent vector configuration that indicates a periodic reporting procedure for reporting updates corresponding to at least one latent vector; determining, using at least one autoencoder, an update corresponding to the at least one latent vector; and transmitting the update corresponding to the at least one latent vector based at least in part on the latent vector configuration.

Aspect 30: The method of Aspect 29, wherein the latent vector configuration indicates a first periodicity associated with reporting updates corresponding to the at least one latent vector, wherein the first periodicity comprises an amount of time between consecutive transmissions of the updates corresponding to the at least one latent vector; and wherein the observed environmental vector configuration indicates a second periodicity associated with reporting the updates corresponding to the at least one observed environmental vector, wherein the second periodicity comprises an amount of time between consecutive transmissions of the updates corresponding to the at least one observed environmental vector.

Aspect 31: The method of Aspect 30, wherein the first periodicity is shorter than the second periodicity.

Aspect 32: The method of Aspect 31, wherein the latent vector configuration or the observed environmental vector configuration, or a combination thereof, is carried in at least one of: a radio resource control message, a medium access control (MAC) control element, or a combination thereof.

Aspect 33: The method of any of Aspects 29-32, wherein the latent vector configuration indicates a first periodicity associated with reporting updates corresponding to the at least one latent vector, wherein the first periodicity comprises an amount of time between consecutive transmissions of the updates corresponding to the at least one latent vector; and wherein the observed environmental vector configuration indicates a scaling factor for determining a second periodicity relative to the first periodicity, wherein the second periodicity comprises an amount of time between consecutive transmissions of the updates corresponding to the at least one observed environmental vector.

Aspect 34: The method of Aspect 33, further comprising determining the second periodicity based at least in part on the first periodicity and the scaling factor.

Aspect 35: The method of Aspect 34, further comprising transmitting an indication of the second periodicity.

Aspect 36: The method of any of Aspects 33-35, wherein the scaling factor comprises an explicit scaling factor.

Aspect 37: The method of any of Aspects 33-36, wherein the observed environmental vector configuration comprises a scaling factor table that maps the first periodicity to one or more second periodicity options.

Aspect 38: The method of Aspect 37, further comprising selecting the second periodicity from the one or more second periodicity options.

Aspect 39: The method of any of Aspects 33-38, wherein the scaling factor comprises an implicit scaling factor, wherein the first periodicity maps to the second periodicity.

Aspect 40: The method of any of Aspects 29-39, further comprising: identifying a collision between a scheduled transmission of an update corresponding to the at least one latent vector and a scheduled transmission of an update corresponding to the at least one observed environmental vector; and transmitting the scheduled transmission of the update corresponding to the at least one observed environmental vector based at least in part on identifying the collision.

Aspect 41: The method of any of Aspects 29-40, wherein the at least one observed environmental vector comprises a plurality of observed environmental vectors and the at least one latent vector comprises a plurality of latent vectors, and wherein transmitting the update comprises: transmitting, according to an ordering, a first plurality of updates that correspond to the plurality of observed environmental vectors; and transmitting, according to the ordering, a second plurality of updates that correspond to the plurality of latent vectors.

Aspect 42: The method of Aspect 41, wherein transmitting the first plurality of updates and the second plurality of updates according to the ordering comprises transmitting the first plurality of updates prior to transmitting the second plurality of updates.

Aspect 43: The method of either of Aspects 41 or 42, wherein transmitting the first plurality of updates and the second plurality of updates according to the ordering comprises: transmitting a first update of the first plurality of updates; transmitting, after transmitting the first update, a second update of the second plurality of updates; transmitting, after transmitting the second update, a third update of the first plurality of updates; and transmitting, after transmitting the third update, a fourth update of the second plurality of updates.

Aspect 44: The method of any of Aspects 29-43, wherein the at least one observed environmental vector comprises a plurality of elements, and wherein the observed environmental vector configuration indicates an ordering associated with transmitting a plurality of updates corresponding to the plurality of elements.

Aspect 45: The method of any of Aspects 29-44, wherein the at least one observed environmental vector comprises a plurality of elements and the at least one latent vector comprises a plurality of latent vectors, and wherein transmitting the update comprises: transmitting, according to an ordering, a first plurality of updates that correspond to the plurality of elements; and transmitting, according to the ordering, a second plurality of updates that correspond to the plurality of latent vectors.

Aspect 46: The method of Aspect 45, wherein transmitting the first plurality of updates and the second plurality of updates according to the ordering comprises transmitting the first plurality of updates prior to transmitting the second plurality of updates.

Aspect 47: The method of either of Aspects 45 or 46, wherein transmitting the first plurality of updates and the second plurality of updates according to the ordering comprises: transmitting a first update of the first plurality of updates; transmitting, after transmitting the first update, a second update of the second plurality of updates; transmitting, after transmitting the second update, a third update of the first plurality of updates; and transmitting, after transmitting the third update, a fourth update of the second plurality of updates.

Aspect 48: The method of any of Aspects 1-47, wherein the at least one observed environmental vector comprises a plurality of observed environmental vectors, and wherein the observed environmental vector configuration indicates an ordering associated with transmitting a plurality of updates corresponding to the plurality of observed environmental vectors.

Aspect 49: The method of Aspect 48, further comprising: identifying a collision between a scheduled transmission of the plurality of updates corresponding to the plurality of observed environmental vectors and an additional transmission; and refraining from transmitting an end portion of a report comprising the plurality of updates corresponding to the plurality of observed environmental vectors based at least in part on identifying the collision.

Aspect 50: The method of either of Aspects 48 or 49, further comprising: receiving a resource allocation associated with a scheduled transmission of the plurality of updates corresponding to the plurality of observed environmental vectors and an additional transmission; determining that the resource allocation is insufficient to transmit a report comprising the plurality of updates corresponding to the plurality of observed environmental vectors; and refraining from transmitting an end portion of the report based at least in part on determining that the resource allocation is insufficient to transmit the report.

Aspect 51: The method of any of Aspects 1-50, further comprising: receiving a latent vector configuration that indicates a dynamic reporting procedure for reporting updates corresponding to at least one latent vector; determining an update corresponding to the at least one latent vector using at least one autoencoder; and transmitting the update corresponding to the at least one latent vector based at least in part on the latent vector configuration.

Aspect 52: The method of Aspect 51, wherein the observed environmental vector configuration comprises an indication to transmit the update corresponding to the at least one observed environmental vector based at least in part on receiving a latent vector feedback request.

Aspect 53: The method of Aspect 52, wherein the latent vector feedback request is carried in at least one of: a downlink control information transmission, a medium access control (MAC) control element, or a combination thereof.

Aspect 54: The method of either of Aspects 52 or 53, wherein the latent vector feedback request comprises a trigger that triggers transmission of an update corresponding to the at least one latent vector, and wherein the trigger further triggers transmission of the update corresponding to the at least one observed environmental vector.

Aspect 55: The method of any of Aspects 52-54, further comprising transmitting a feedback resource request, wherein the feedback resource request comprises a request for: a first set of resources for transmitting the update corresponding to the at least one latent vector, a second set of resources for transmitting the update corresponding to the at least one observed environmental vector, or a combination thereof.

Aspect 56: The method of any of Aspects 52-55, further comprising: determining an occurrence of an update reporting trigger event; and transmitting, based at last on determining the occurrence of the update reporting trigger event, at least one of the update corresponding to the at least one observed environmental vector or the update corresponding to the at least one latent vector.

Aspect 57: The method of any of Aspects 52-56, wherein determining the update corresponding to the at least one latent vector comprises determining a locally updated latent vector based at least in part on at least one previously reported observed environmental vector.

Aspect 58: The method of any of Aspects 52-57, wherein determining the update corresponding to the at least one latent vector comprises determining a locally updated latent vector based at least in part on a default observed environmental vector.

Aspect 59: The method of Aspect 58, wherein the default observed environmental vector comprises an initial observed environmental vector that was determined at an initialization phase.

Aspect 60: The method of Aspect 58, wherein the default observed environmental vector comprises an initial observed environmental vector that was determined at a setup phase.

Aspect 61: The method of any of Aspects 1-60, further comprising determining the update by determining a locally updated observed environmental vector.

Aspect 62: The method of Aspect 61, wherein transmitting the update comprises: quantizing the locally updated observed environmental vector to generate a quantized update; and transmitting the quantized update.

Aspect 63: The method of Aspect 62, wherein the locally updated observed environmental vector comprises a plurality of elements, and wherein quantizing the locally updated observed environmental vector comprises quantizing each of the plurality of elements.

Aspect 64: The method of either of Aspects 62 or 63, further comprising determining an indication of a bit size corresponding to the quantized update, wherein the quantized update comprises a fixed bit number, and wherein the fixed bit number comprises the bit size.

Aspect 65: The method of Aspect 64, wherein the indication of the bit size is carried in at least one of: the observed environmental vector configuration, a radio resource control message, a downlink control information transmission, a medium access control (MAC) control element, or a combination thereof.

Aspect 66: The method of any of Aspects 62-65, further comprising determining an indication of a maximum bit size corresponding to the quantized update, wherein the quantized update comprises a variable bit number, and wherein the variable bit number comprises a bit size that is less than or equal to the maximum bit size.

Aspect 67: The method of Aspect 66, further comprising transmitting a quantization capability indication that indicates a maximum bit size for quantization of customization feature vector updates, wherein the maximum bit size is based at least in part on the quantization capability indication.

Aspect 68: The method of Aspect 67, further comprising receiving a resource allocation for transmitting the update, and wherein the maximum bit size is based at least in part on the resource allocation.

Aspect 69: The method of any of Aspects 66-68, wherein the indication of the maximum bit size is carried in at least one of: the observed environmental vector configuration, a radio resource control message, a downlink control information transmission, a medium access control (MAC) control element, or a combination thereof.

Aspect 70: The method of any of Aspects 62-69, wherein the quantized update comprises a non-uniform quantization of one or more elements of the locally updated observed environmental vector.

Aspect 71: The method of Aspect 70, further comprising receiving an indication of a non-uniform quantization scheme, wherein the non-uniform quantization is based at least in part on the indication of the non-uniform quantization scheme, wherein the non-uniform quantization scheme is carried in at least one of: the observed environmental vector configuration, a radio resource control message, a downlink control information transmission, a medium access control (MAC) control element, or a combination thereof.

Aspect 72: The method of Aspect 71, further comprising transmitting a non-uniform quantization capability indication, wherein the non-uniform quantization scheme is based at least in part on the non-uniform quantization capability indication.

Aspect 73: The method of either of Aspects 71 or 72, further comprising transmitting a non-uniform quantization suggestion, wherein the non-uniform quantization scheme is based at least in part on the non-uniform quantization suggestion.

Aspect 74: A method of wireless communication performed by a server, comprising: transmitting an observed environmental vector feedback configuration associated with a reporting procedure for reporting updates corresponding to at least one observed environmental vector that is based at least in part on one or more features associated with an environment of a client, wherein the observed environmental vector comprises input for a first machine learning component that determines client specific parameters for use by a second machine learning component; and receiving an update corresponding to the at least one observed environmental vector based at least in part on the observed environmental vector feedback configuration.

Aspect 75: The method of Aspect 74, wherein the first machine learning component comprises a first neural network.

Aspect 76: The method of Aspect 75, wherein the first neural network comprises a conditioning network.

Aspect 77: The method of any of Aspects 74-76, wherein the second machine learning component comprises a second neural network.

Aspect 78: The method of Aspect 77, wherein the second neural network comprises an autoencoder.

Aspect 79: The method of any of Aspects 74-78, wherein the at least one observed environmental vector comprises one or more elements, wherein the one or more elements indicate at least one of: a client vendor identifier (ID), a client ID, a radio network temporary ID, a client antenna configuration, a client interference level, a panel ID, a reception beam ID, a large scale channel characteristic, a channel state information reference signal configuration, a serving cell ID, image data associated with an image obtained by an imaging device associated with the client, an element of an observed wireless communication vector, or a combination thereof.

Aspect 80: The method of Aspect 79, wherein the client ID comprises at least one of: an international mobile equipment identity, an international mobile subscriber identity, or a combination thereof.

Aspect 81: The method of either of Aspects 79 or 80, wherein the large scale channel characteristic indicates at least one of: a delay spread associated with a channel, a power delay profile associated with a channel, a Doppler measurement associated with a channel, a Doppler spectrum associated with a channel, a signal to noise ratio associated with a channel, a signal to noise plus interference ratio associated with a channel, a reference signal received power, a received signal strength indicator, or a combination thereof.

Aspect 82: The method of any of Aspects 74-81, further comprising determining the update by determining a set of values corresponding to the at least one observed environmental vector.

Aspect 83: The method of any of Aspects 74-82, wherein the update comprises a locally updated observed environmental vector.

Aspect 84: The method of any of Aspects 74-83, wherein the update comprises a subset of elements of a locally updated observed environmental vector that are different than a corresponding subset of elements of a previously transmitted update.

Aspect 85: The method of any of Aspects 74-84, wherein the at least one observed environmental vector comprises a plurality of observed environmental vectors.

Aspect 86: The method of Aspect 85, wherein the plurality of observed environmental vectors corresponds to a plurality of communication parameters.

Aspect 87: The method of Aspect 86, wherein the plurality of communication parameters indicate at least one of: a component carrier, a bandwidth part, a band, a band combination, a frequency range, a use case, a neural network identifier, or a combination thereof.

Aspect 88: The method of Aspect 87, wherein the use case comprises at least one of: a channel state information derivation, a positioning measurement derivation, demodulation of a data channel, or a combination thereof.

Aspect 89: The method of any of Aspects 86-88, wherein a first observed environmental vector of the plurality of observed environmental vectors corresponds to a first communication parameter of the plurality of communication parameters, and wherein a second observed environmental vector of the plurality of observed environmental vectors corresponds to a second communication parameter of the plurality of communication parameters.

Aspect 90: The method of any of Aspects 74-89, further comprising: transmitting a capability report that indicates a number of observed environmental vectors that the client can support; wherein the observed environmental vector configuration is based at least in part on the capability report.

Aspect 91: The method of any of Aspects 74-90, wherein transmitting the update comprises transmitting the update using at least one of: an uplink medium access control (MAC) control element, a radio resource control message, an uplink control information report, or a combination thereof.

Aspect 92: The method of any of Aspects 74-91, wherein the observed environmental vector configuration indicates at least one transmission parameter that indicates a quantity of scheduled uplink resources that can be used to carry one or more portions of the update.

Aspect 93: The method of Aspect 92, wherein the quantity of the scheduled uplink resources corresponds to a percentage of a set of allocated uplink resources.

Aspect 94: The method of Aspect 93, wherein the set of allocated uplink resources correspond to at least one of: a physical uplink control channel (PUCCH), a physical uplink shared channel (PUSCH), or a combination thereof.

Aspect 95: The method of Aspect 94, wherein the set of allocated uplink resources correspond to the PUCCH, and wherein the set of allocated uplink resources correspond to an uplink control information report.

Aspect 96: The method of any of Aspects 74-95, wherein the update comprises a conditioning network input indication that indicates one or more elements of the at least one observed environmental vector that are to be provided to a conditioning network as input for determining a conditioning vector.

Aspect 97: The method of Aspect 96, wherein the conditioning network input indication comprises one or more indices corresponding to the one or more elements.

Aspect 98: The method of either of Aspects 96 or 97, wherein the conditioning network input indication comprises a bitmap that indicates the one or more indices.

Aspect 99: The method of any of Aspects 96-98, wherein the update comprises: a first part comprising the conditioning network input indication; and a second part comprising a set of values corresponding to the at least one observed environmental vector.

Aspect 100: The method of Aspect 99, wherein receiving the update comprises: receiving the first part using a physical uplink control channel; and receiving the second part using a physical uplink shared channel.

Aspect 101: The method of either of Aspects 99 or 100, wherein receiving the update comprises: receiving the first part using an uplink control information (UCI) report, wherein the first part comprises a bitmap; and receiving the second part using the UCI report.

Aspect 102: The method of any of Aspects 74-101, further comprising: transmitting a latent vector configuration that indicates a periodic reporting procedure for reporting updates corresponding to at least one latent vector; and receiving an update corresponding to the at least one latent vector based at least in part on the latent vector configuration.

Aspect 103: The method of Aspect 102, wherein the latent vector configuration indicates a first periodicity associated with reporting updates corresponding to the at least one latent vector, wherein the first periodicity comprises an amount of time between consecutive transmissions of the updates corresponding to the at least one latent vector; and wherein the observed environmental vector configuration indicates a second periodicity associated with reporting the updates corresponding to the at least one observed environmental vector, wherein the second periodicity comprises an amount of time between consecutive transmissions of the updates corresponding to the at least one observed environmental vector.

Aspect 104: The method of Aspect 103, wherein the first periodicity is shorter than the second periodicity.

Aspect 105: The method of either of Aspects 103 or 104, wherein the latent vector configuration or the observed environmental vector configuration, or a combination thereof, is carried in at least one of: a radio resource control message, a medium access control (MAC) control element, or a combination thereof.

Aspect 106: The method of any of Aspects 102-105, wherein the latent vector configuration indicates a first periodicity associated with reporting updates corresponding to the at least one latent vector, wherein the first periodicity comprises an amount of time between consecutive transmissions of the updates corresponding to the at least one latent vector; and wherein the observed environmental vector configuration indicates a scaling factor for determining a second periodicity relative to the first periodicity, wherein the second periodicity comprises an amount of time between consecutive transmissions of the updates corresponding to the at least one observed environmental vector.

Aspect 107: The method of Aspect 106, wherein the second periodicity is based at least in part on the first periodicity and the scaling factor.

Aspect 108: The method of Aspect 107, further comprising receiving an indication of the second periodicity.

Aspect 109: The method of any of Aspects 106-108, wherein the scaling factor comprises an explicit scaling factor.

Aspect 110: The method of any of Aspects 106-109, wherein the observed environmental vector configuration comprises a scaling factor table that maps the first periodicity to one or more second periodicity options.

Aspect 111: The method of any of Aspects 106-110, wherein the second periodicity is selected from one or more second periodicity options.

Aspect 112: The method of any of Aspects 106-111, wherein the scaling factor comprises an implicit scaling factor, wherein the first periodicity maps to the second periodicity.

Aspect 113: The method of any of Aspects 102-112, wherein the at least one observed environmental vector comprises a plurality of observed environmental vectors and the at least one latent vector comprises a plurality of latent vectors, and wherein receiving the update comprises: receiving, according to an ordering, a first plurality of updates that correspond to the plurality of observed environmental vectors; and receiving, according to the ordering, a second plurality of updates that correspond to the plurality of latent vectors.

Aspect 114: The method of Aspect 113, wherein receiving the first plurality of updates and the second plurality of updates according to the ordering comprises receiving the first plurality of updates prior to receiving the second plurality of updates.

Aspect 115: The method of either of Aspects 113 or 114, wherein receiving the first plurality of updates and the second plurality of updates according to the ordering comprises: receiving a first update of the first plurality of updates; receiving, after receiving the first update, a second update of the second plurality of updates; receiving, after receiving the second update, a third update of the first plurality of updates; and receiving, after receiving the third update, a fourth update of the second plurality of updates.

Aspect 116: The method of any of Aspects 102-115, wherein the at least one observed environmental vector comprises a plurality of elements, and wherein the observed environmental vector configuration indicates an ordering associated with transmitting a plurality of updates corresponding to the plurality of elements.

Aspect 117: The method of any of Aspects 102-116, wherein the at least one observed environmental vector comprises a plurality of elements and the at least one latent vector comprises a plurality of latent vectors, and wherein receiving the update comprises: receiving, according to an ordering, a first plurality of updates that correspond to the plurality of elements; and receiving, according to the ordering, a second plurality of updates that correspond to the plurality of latent vectors.

Aspect 118: The method of Aspect 117, wherein receiving the first plurality of updates and the second plurality of updates according to the ordering comprises receiving the first plurality of updates prior to receiving the second plurality of updates.

Aspect 119: The method of either of Aspects 117 or 118, wherein receiving the first plurality of updates and the second plurality of updates according to the ordering comprises: receiving a first update of the first plurality of updates; receiving, after receiving the first update, a second update of the second plurality of updates; receiving, after receiving the second update, a third update of the first plurality of updates; and receiving, after receiving the third update, a fourth update of the second plurality of updates.

Aspect 120: The method of any of Aspects 74-119, wherein the at least one observed environmental vector comprises a plurality of observed environmental vectors, and wherein the observed environmental vector configuration indicates an ordering associated with transmitting a plurality of updates corresponding to the plurality of observed environmental vectors.

Aspect 121: The method of any of Aspects 74-120, further comprising: transmitting a latent vector configuration that indicates a dynamic reporting procedure for reporting updates corresponding to at least one latent vector; and receiving an update corresponding to the at least one latent vector based at least in part on the latent vector configuration.

Aspect 122: The method of Aspect 121, wherein the observed environmental vector configuration comprises an indication to transmit the update corresponding to the at least one observed environmental vector based at least in part on receiving a latent vector feedback request.

Aspect 123: The method of Aspect 122, wherein the latent vector feedback request is carried in at least one of: a downlink control information transmission, a medium access control (MAC) control element, or a combination thereof.

Aspect 124: The method of either of Aspects 122 or 123, wherein the latent vector feedback request comprises a trigger that triggers transmission of an update corresponding to the at least one latent vector, and wherein the trigger further triggers transmission of the update corresponding to the at least one observed environmental vector.

Aspect 125: The method of any of Aspects 122-124, further comprising receiving a feedback resource request, wherein the feedback resource request comprises a request for: a first set of resources for transmitting the update corresponding to the at least one latent vector, a second set of resources for transmitting the update corresponding to the at least one observed environmental vector, or a combination thereof.

Aspect 126: The method of any of Aspects 122-125, further comprising receiving, based at last on a determination of an occurrence of an update reporting trigger event, at least one of the update corresponding to the at least one observed environmental vector or the update corresponding to the at least one latent vector.

Aspect 127: The method of any of Aspects 122-126, wherein the update corresponding to the at least one latent vector comprises a locally updated latent vector based at least in part on at least one previously reported observed environmental vector.

Aspect 128: The method of any of Aspects 122-127, wherein the update corresponding to the at least one latent vector comprises a locally updated latent vector based at least in part on a default observed environmental vector.

Aspect 129: The method of Aspect 128, wherein the default observed environmental vector comprises an initial observed environmental vector that was determined at an initialization phase.

Aspect 130: The method of Aspect 128, wherein the default observed environmental vector comprises an initial observed environmental vector that was determined at a setup phase.

Aspect 131: The method of any of Aspects 74-130, wherein the update comprises a locally updated observed environmental vector.

Aspect 132: The method of Aspect 131, wherein receiving the update comprises receiving a quantized update that comprises a quantized locally updated observed environmental vector.

Aspect 133: The method of Aspect 132, wherein the locally updated observed environmental vector comprises a plurality of elements, and wherein each of the plurality of elements is quantized.

Aspect 134: The method of either of Aspects 132 or 133, further comprising transmitting an indication of a bit size corresponding to the quantized update, wherein the quantized update comprises a fixed bit number, and wherein the fixed bit number comprises the bit size.

Aspect 135: The method of Aspect 134, wherein the indication of the bit size is carried in at least one of: the observed environmental vector configuration, a radio resource control message, a downlink control information transmission, a medium access control (MAC) control element, or a combination thereof.

Aspect 136: The method of any of Aspects 132-135, further comprising transmitting an indication of a maximum bit size corresponding to the quantized update, wherein the quantized update comprises a variable bit number, and wherein the variable bit number comprises a bit size that is less than or equal to the maximum bit size.

Aspect 137: The method of Aspect 136, further comprising receiving a quantization capability indication that indicates a maximum bit size for quantization of customization feature vector updates, wherein the maximum bit size is based at least in part on the quantization capability indication.

Aspect 138: The method of either of Aspects 136 or 137, further comprising transmitting a resource allocation for transmitting the update, and wherein the maximum bit size is based at least in part on the resource allocation.

Aspect 139: The method of any of Aspects 136-138, wherein the indication of the maximum bit size is carried in at least one of: the observed environmental vector configuration, a radio resource control message, a downlink control information transmission, a medium access control (MAC) control element, or a combination thereof.

Aspect 140: The method of any of Aspects 136-139, wherein the quantized update comprises a non-uniform quantization of one or more elements of the locally updated observed environmental vector.

Aspect 141: The method of Aspect 140, further comprising transmitting an indication of a non-uniform quantization scheme, wherein the non-uniform quantization is based at least in part on the indication of the non-uniform quantization scheme, wherein the non-uniform quantization scheme is carried in at least one of: the observed environmental vector configuration, a radio resource control message, a downlink control information transmission, a medium access control (MAC) control element, or a combination thereof.

Aspect 142: The method of Aspect 141, further comprising receiving a non-uniform quantization capability indication, wherein the non-uniform quantization scheme is based at least in part on the non-uniform quantization capability indication.

Aspect 143: The method of either of Aspects 141 or 142, further comprising receiving a non-uniform quantization suggestion, wherein the non-uniform quantization scheme is based at least in part on the non-uniform quantization suggestion.

Aspect 144: An apparatus for wireless communication at a device, comprising a processor; memory coupled with the processor; and instructions stored in the memory and executable by the processor to cause the apparatus to perform the method of one or more of Aspects 1-73.

Aspect 145: A device for wireless communication, comprising a memory and one or more processors coupled to the memory, the one or more processors configured to perform the method of one or more of Aspects 1-73.

Aspect 146: An apparatus for wireless communication, comprising at least one means for performing the method of one or more of Aspects 1-73.

Aspect 147: A non-transitory computer-readable medium storing code for wireless communication, the code comprising instructions executable by a processor to perform the method of one or more of Aspects 1-73.

Aspect 148: A non-transitory computer-readable medium storing a set of instructions for wireless communication, the set of instructions comprising one or more instructions that, when executed by one or more processors of a device, cause the device to perform the method of one or more of Aspects 1-73.

Aspect 149: An apparatus for wireless communication at a device, comprising a processor; memory coupled with the processor; and instructions stored in the memory and executable by the processor to cause the apparatus to perform the method of one or more of Aspects 74-143.

Aspect 150: A device for wireless communication, comprising a memory and one or more processors coupled to the memory, the one or more processors configured to perform the method of one or more of Aspects 74-143.

Aspect 151: An apparatus for wireless communication, comprising at least one means for performing the method of one or more of Aspects 74-143.

Aspect 152: A non-transitory computer-readable medium storing code for wireless communication, the code comprising instructions executable by a processor to perform the method of one or more of Aspects 74-143.

Aspect 153: A non-transitory computer-readable medium storing a set of instructions for wireless communication, the set of instructions comprising one or more instructions that, when executed by one or more processors of a device, cause the device to perform the method of one or more of Aspects 74-143.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A client for wireless communication, comprising:
   a memory; and
   one or more processors coupled to the memory and configured to:
      receive an observed environmental vector feedback configuration associated with a reporting procedure for reporting updates corresponding to at least one observed environmental vector that is based at least in part on one or more features associated with an environment of the client, wherein the observed environmental vector comprises input for a first machine learning component that determines client specific parameters for use by a second machine learning component; and transmit an update corresponding to the at least one observed environmental vector based at least in part on the observed environmental vector feedback configuration, wherein:
the one or more processors are further configured to transmit a capability report that indicates a number of observed environmental vectors that the client can support, wherein the observed environmental vector feedback configuration is based at least in part on the capability report; or the observed environmental vector feedback configuration indicates at least one transmission parameter that indicates a quantity of scheduled uplink resources that are to be used to carry one or more portions of the update; or the update comprises an input of a conditioning network indication that indicates one or more elements of the at least one observed environmental vector that are to be provided to the conditioning network as input for determining a conditioning vector; or the at least one observed environmental vector is among a plurality of observed environmental vectors, and wherein the observed environmental vector feedback configuration indicates an ordering associated with transmission of a plurality of updates corresponding to the plurality of observed environmental vectors.

2. The client of claim 1, wherein the one or more processors are further configured to:
transmit the capability report that indicates the number of observed environmental vectors that the client can support;
wherein the observed environmental vector feedback configuration is based at least in part on the capability report.

3. The client of claim 1, wherein the observed environmental vector feedback configuration indicates the at least one transmission parameter that indicates the quantity of scheduled uplink resources that are to be used to carry one or more portions of the update.

4. The client of claim 1, wherein the update comprises the input of the conditioning network indication that indicates the one or more elements of the at least one observed environmental vector that are to be provided to the conditioning network as input for determining the conditioning vector.

5. The client of claim 4, wherein the conditioning network input indication comprises one or more indices corresponding to the one or more elements, or wherein the update comprises:
a first part comprising the conditioning network input indication; and
a second part comprising a set of values corresponding to the at least one observed environmental vector.

6. The client of claim 5, wherein the update comprises the first part comprising the conditioning network input indication and the second part comprising the set of values corresponding to the at least one observed environmental vector, and wherein the one or more processors, to transmit the update, are configured to:
transmit the first part using a physical uplink control channel, and transmit the second part using a physical uplink shared channel; or transmit the first part using an uplink control information (UCI) report, wherein the first part comprises a bitmap, and transmit the second part using the UCI report.

7. The client of claim 1, wherein the at least one observed environmental vector is among the plurality of observed environmental vectors, and
wherein the observed environmental vector feedback configuration indicates the ordering associated with transmission of the plurality of updates corresponding to the plurality of observed environmental vectors.

8. A client for wireless communication, comprising:
a memory; and
one or more processors coupled to the memory and configured to:
receive an observed environmental vector feedback configuration associated with a reporting procedure for reporting updates corresponding to at least one observed environmental vector that is based at least in part on one or more features associated with an environment of the client, wherein the observed environmental vector comprises input for a first machine learning component that determines client specific parameters for use by a second machine learning component; and
transmit an update corresponding to the at least one observed environmental vector based at least in part on the observed environmental vector feedback configuration,
wherein the one or more processors are further configured to:
(i) receive a latent vector configuration that indicates a dynamic reporting procedure for reporting updates corresponding to one or more latent vectors, (ii) determine an update corresponding to the one or more latent vectors using one or more autoencoders, and (iii) transmit the update corresponding to the one or more latent vectors based at least in part on the latent vector configuration that indicates the dynamic reporting procedure; or
(i) receive a latent vector configuration that indicates a periodic reporting procedure for reporting updates corresponding to at least one latent vector, (ii) determine, using at least one autoencoder, an update corresponding to the at least one latent vector, and (iii) transmit the update corresponding to the at least one latent vector based at least in part on the latent vector configuration that indicates a periodic reporting procedure.

9. The client of claim 8, wherein the one or more processors are configured to:
receive the latent vector configuration that indicates the dynamic reporting procedure for reporting updates corresponding to the one or more latent vectors;
determine the update corresponding to the one or more latent vectors using the one or more autoencoders; and
transmit the update corresponding to the one or more latent vectors based at least in part on the latent vector configuration that indicates the dynamic reporting procedure.

10. The client of claim 8, wherein the one or more processors are configured to:
receive the latent vector configuration that indicates the periodic reporting procedure for reporting updates corresponding to at least one latent vector;
determine, using at least one autoencoder, the update corresponding to the at least one latent vector; and transmit the update corresponding to the at least one latent vector based at least in part on the latent vector configuration that indicates a periodic reporting procedure.

11. The client of claim 10, wherein the latent vector configuration indicates a first periodicity associated with reporting one or more updates corresponding to the at least one latent vector, wherein the first periodicity comprises an amount of time between consecutive transmissions of the one or more updates corresponding to the at least one latent vector.

12. The client of claim 10, wherein the one or more processors are further configured to:
identify a collision between a scheduled transmission of an update corresponding to the at least one latent vector and a scheduled transmission of an update corresponding to the at least one observed environmental vector; and
transmit the scheduled transmission of the update corresponding to the at least one observed environmental vector based at least in part on identifying the collision.

13. The client of claim 10, wherein the at least one observed environmental vector comprises a plurality of observed environmental vectors and the at least one latent vector comprises a plurality of latent vectors, and
wherein the one or more processors, to transmit the update, are configured to:
transmit, according to an ordering, a first plurality of updates that correspond to the plurality of observed environmental vectors; and
transmit, according to the ordering, a second plurality of updates that correspond to the plurality of latent vectors.

14. The client of claim 13, wherein the one or more processors, to transmit the first plurality of updates and the second plurality of updates according to the ordering, are configured to transmit the first plurality of updates prior to transmitting the second plurality of updates, or are configured to:
transmit a first update of the first plurality of updates;
transmit, after transmitting the first update, a second update of the second plurality of updates;
transmit, after transmitting the second update, a third update of the first plurality of updates; and
transmit, after transmitting the third update, a fourth update of the second plurality of updates.

15. The client of claim 10, wherein the at least one observed environmental vector comprises a plurality of elements, and wherein the observed environmental vector feedback configuration indicates an ordering associated with transmitting a plurality of updates corresponding to the plurality of elements.

16. A method for wireless communication by a client, comprising:
receiving an observed environmental vector feedback configuration associated with a reporting procedure for reporting updates corresponding to at least one observed environmental vector that is based at least in part on one or more features associated with an environment of the client, wherein the observed environmental vector comprises input for a first machine learning component that determines client specific parameters for use by a second machine learning component; and
transmitting an update corresponding to the at least one observed environmental vector based at least in part on the observed environmental vector feedback configuration,
wherein:
the method further comprises transmitting a capability report that indicates a number of observed environmental vectors that the client can support, wherein the observed environmental vector feedback configuration is based at least in part on the capability report; or
the observed environmental vector feedback configuration indicates at least one transmission parameter that indicates a quantity of scheduled uplink resources that are to be used to carry one or more portions of the update; or
the update comprises an input of a conditioning network indication that indicates one or more elements of the at least one observed environmental vector that are to be provided to the conditioning network as input for determining a conditioning vector; or
the at least one observed environmental vector comprises a plurality of observed environmental vectors, and wherein the observed environmental vector feedback configuration indicates an ordering associated with transmitting a plurality of updates corresponding to the plurality of observed environmental vectors.

17. The method of claim 16, wherein the method comprises:
transmitting the capability report that indicates the number of observed environmental vectors that the client can support;
wherein the observed environmental vector feedback configuration is based at least in part on the capability report.

18. The method of claim 16, wherein the observed environmental vector feedback configuration indicates the at least one transmission parameter that indicates the quantity of scheduled uplink resources that are to be used to carry one or more portions of the update.

19. The method of claim 16, wherein the update comprises the input of the conditioning network indication that indicates the one or more elements of the at least one observed environmental vector that are to be provided to the conditioning network as input for determining the conditioning vector.

20. The method of claim 19, wherein the conditioning network input indication comprises one or more indices corresponding to the one or more elements, or wherein the update comprises:
a first part comprising the conditioning network input indication; and
a second part comprising a set of values corresponding to the at least one observed environmental vector.

21. The method of claim 20, wherein the update comprises a first part comprising the conditioning network input indication, and a second part comprising a set of values corresponding to the at least one observed environmental vector, and wherein transmitting the update comprises:
transmitting the first part using a physical uplink control channel, and transmit the second part using a physical uplink shared channel; or
transmitting the first part using an uplink control information (UCI) report, wherein the first part comprises a bitmap, and transmit the second part using the UCI report.

22. The method of claim 16, wherein the at least one observed environmental vector comprises the plurality of observed environmental vectors, and wherein the observed environmental vector feedback configuration indicates the ordering associated with transmitting the plurality of updates corresponding to the plurality of observed environmental vectors.

23. A method for wireless communication by a client, comprising:

receiving an observed environmental vector feedback configuration associated with a reporting procedure for reporting updates corresponding to at least one observed environmental vector that is based at least in part on one or more features associated with an environment of the client, wherein the observed environmental vector comprises input for a first machine learning component that determines client specific parameters for use by a second machine learning component; and transmitting an update corresponding to the at least one observed environmental vector based at least in part on the observed environmental vector feedback configuration, wherein the method further comprises:
(i) receiving a latent vector configuration that indicates a dynamic reporting procedure for reporting updates corresponding to one or more latent vectors, (ii) determining an update corresponding to the one or more latent vectors using one or more autoencoders, and (iii) transmitting the update corresponding to the one or more latent vectors based at least in part on the latent vector configuration that indicates the dynamic reporting procedure; or
(i) receiving a latent vector configuration that indicates a periodic reporting procedure for reporting updates corresponding to at least one latent vector, (ii) determining, using at least one autoencoder, an update corresponding to the at least one latent vector, and (iii) transmitting the update corresponding to the at least one latent vector based at least in part on the latent vector configuration that indicates a periodic reporting procedure.

24. The method of claim 23, wherein the method comprises:

receiving the latent vector configuration that indicates the dynamic reporting procedure for reporting updates corresponding to the one or more latent vectors;

determining the update corresponding to the one or more latent vectors using the one or more autoencoders; and transmitting the update corresponding to the one or more latent vectors based at least in part on the latent vector configuration that indicates the dynamic reporting procedure.

25. The method of claim 23, wherein the method comprises:

receiving the latent vector configuration that indicates the periodic reporting procedure for reporting updates corresponding to at least one latent vector;

determining, using at least one autoencoder, the update corresponding to the at least one latent vector; and transmitting the update corresponding to the at least one latent vector based at least in part on the latent vector configuration that indicates a periodic reporting procedure.

26. The method of claim 25, wherein the latent vector configuration indicates a first periodicity associated with reporting one or more updates corresponding to the at least one latent vector, wherein the first periodicity comprises an amount of time between consecutive transmissions of the one or more updates corresponding to the at least one latent vector.

27. The method of claim 25, wherein the method comprises:

identifying a collision between a scheduled transmission of an update corresponding to the at least one latent vector and a scheduled transmission of an update corresponding to the at least one observed environmental vector; and transmitting the scheduled transmission of the update corresponding to the at least one observed environmental vector based at least in part on identifying the collision.

28. The method of claim 25, wherein the at least one observed environmental vector comprises a plurality of observed environmental vectors and the at least one latent vector comprises a plurality of latent vectors, and wherein transmitting the update comprises:
transmitting, according to an ordering, a first plurality of updates that correspond to the plurality of observed environmental vectors; and
transmitting, according to the ordering, a second plurality of updates that correspond to the plurality of latent vectors.

29. The method of claim 28, wherein transmitting the first plurality of updates and the second plurality of updates according to the ordering comprises transmitting the first plurality of updates prior to transmitting the second plurality of updates, or wherein transmitting the first plurality of updates and the second plurality of updates according to the ordering comprises:

transmitting a first update of the first plurality of updates;
transmitting, after transmitting the first update, a second update of the second plurality of updates;
transmitting, after transmitting the second update, a third update of the first plurality of updates; and
transmitting, after transmitting the third update, a fourth update of the second plurality of updates.

30. The method of claim 25, wherein the at least one observed environmental vector comprises a plurality of elements, and wherein the observed environmental vector feedback configuration indicates an ordering associated with transmitting a plurality of updates corresponding to the plurality of elements.

* * * * *